(12) United States Patent
Awadh et al.

(10) Patent No.: US 11,413,605 B2
(45) Date of Patent: Aug. 16, 2022

(54) MOLYBDENUM BASED CATALYST SUPPORTED ON TITANIA-MODIFIED ZEOLITE

(71) Applicant: King Fahd University of Petroleum and Minerals, Dhahran (SA)

(72) Inventors: Tawfik Abdo Saleh Awadh, Dhahran (SA); Islam Ali Elsayed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/554,046

(22) Filed: Aug. 28, 2019

(65) Prior Publication Data

US 2021/0060536 A1 Mar. 4, 2021

(51) Int. Cl.
*B01J 23/882* (2006.01)
*B01J 23/28* (2006.01)
(Continued)

(52) U.S. Cl.
CPC ........ *B01J 23/882* (2013.01); *B01D 53/8612* (2013.01); *B01J 23/28* (2013.01);
(Continued)

(58) Field of Classification Search
CPC .... B01J 23/882; B01J 35/1038; B01J 29/061; B01J 35/1061; B01J 37/0236; B01J 37/0201; B01J 35/1019; B01J 37/08; B01J 23/28; C10G 45/12; C10G 2300/207; C10G 2300/70; C10G 2300/20; B01D 53/8612; B01D 2255/20769; B01D 2255/20746; B01D 2255/9205; B01D 2255/9207; B01D 2255/20723; B01D 2255/9202

See application file for complete search history.

(56) References Cited

U.S. PATENT DOCUMENTS 4,324,647 A * 4/1982 Gardner ................. C10G 47/20
208/111.1
4,333,858 A 6/1982 Decker et al.
(Continued)

FOREIGN PATENT DOCUMENTS

CN 102247862 A 11/2011
CN 106622358 A 5/2017

OTHER PUBLICATIONS

Wang, et al. ; Deep hydrodesulfurization over Co/Mo catalysts supported on oxides containing vanadium ; Journal of Catalysis vol. 262, Issue 2 ; pp. 206-214 ; Mar. 10, 2009 ; Abstract Only ; 2 Pages.
(Continued)

*Primary Examiner* — Randy Boyer
*Assistant Examiner* — Juan C Valencia
(74) *Attorney, Agent, or Firm* — Oblon, McClelland, Maier & Neustadt, L.L.P.

(57) ABSTRACT

A supported catalyst having catalytic species including molybdenum as well as cobalt and/or vanadium as a promoter disposed on a support material containing zeolite modified with titanium dioxide. Various methods of preparing and characterizing the supported catalyst are disclosed. The utilization of the catalyst in treating a hydrocarbon feedstock containing sulfur compounds (e.g. dibenzothiophene) to produce a desulfurized hydrocarbon stream is also provided.

13 Claims, 19 Drawing Sheets

(51) Int. Cl.
*B01J 35/10* (2006.01)
*B01J 37/02* (2006.01)
*B01J 37/08* (2006.01)
*B01D 53/86* (2006.01)
*C10G 45/12* (2006.01)
*B01J 29/06* (2006.01)

(52) U.S. Cl.
CPC ......... *B01J 29/061* (2013.01); *B01J 35/1019* (2013.01); *B01J 35/1038* (2013.01); *B01J 35/1061* (2013.01); *B01J 37/0201* (2013.01); *B01J 37/0236* (2013.01); *B01J 37/08* (2013.01); *C10G 45/12* (2013.01); *B01D 2255/20723* (2013.01); *B01D 2255/20746* (2013.01); *B01D 2255/20769* (2013.01); *B01D 2255/9202* (2013.01); *B01D 2255/9205* (2013.01); *B01D 2255/9207* (2013.01); *C10G 2300/202* (2013.01); *C10G 2300/207* (2013.01); *C10G 2300/70* (2013.01)

(56) References Cited

U.S. PATENT DOCUMENTS

| 4,913,797 | A | * | 4/1990 | Albinson | C10G 65/043 208/111.3 |
| 5,409,599 | A | * | 4/1995 | Harandi | C10G 45/02 208/210 |
| 5,430,000 | A | * | 7/1995 | Timken | B01J 29/40 502/64 |
| 7,951,745 | B2 | | 5/2011 | Zhou et al. | |
| 2016/0332152 | A1 | * | 11/2016 | Parvulescu | B01J 29/7088 |
| 2018/0297017 | A1 | | 10/2018 | Chinta et al. | |

OTHER PUBLICATIONS

Wang, et al. ; Catalytic hydrodesulfurization and hydrodenitrogenation over Co☐Mo on TiO2 ☐ZrO2 ☐V2O5 ; Journal of Catalysis, vol. 117, Issue 1 ; pp. 266-274 ; May 1989 ; Abstract Only ; 1 Page.

Zheng, et al. ; Selective Catalytic Reduction of NO with Ammonia and Hydrocarbon Oxidation Over V2O5-MoO3/TiO2 and V2O5—WO3 /TiO2 SCR Catalysts ; Topics in Catalysis, Issue 1-4 ; 2009 ; Abstract Only ; 1 Page.

Ma, et al. ; Denitri_cation Activities of Mo—V—Ti Catalysts Prepared by Dipping Method at Low Temperature ; Materials Science Forum vol. 913 ; Feb. 2018 ; Abstract Only ; 2 Pages

* cited by examiner

MOLYBDENUM BASED CATALYST SUPPORTED ON TITANIA-MODIFIED ZEOLITE

STATEMENT OF ACKNOWLEDGEMENT

The inventors acknowledge the support provided by King Fand University of Petroleum and Minerals (KFUPM) and chemistry department of KFUPM.

BACKGROUND OF THE INVENTION

Technical Field

The present disclosure relates to hydrodesulfurization catalysts containing molybdenum and a promoter such as cobalt and/or vanadium supported by titania-modified zeolite, a method of producing the catalysts, and a process of hydrodesulfurization using the catalysts.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydrotreatment is a reaction process whereby crude oil and refinery streams are hydrogenated. Hydrotreatment is a term that refers to several procedures including saturation of hydrocarbons and elimination of undesired heteroatoms such as nitrogen (hydrodenitrogenation, HDN), sulfur (hydrodesulfurization, HDS) and (hydrodeoxygenation, HDO). These hydrotreating processes have been extensively utilized in industrial refining to manufacture light oil streams from heavy crude oils. The performance of hydrotreating catalysts such as HDS catalyst impacts the energy efficiency of a refinery process.

Currently, environmental regulations limit sulfur content allowed in transportation fuels and other petroleum products [S. Garg, K. Soni, G. M. Kumaran, M. Kumar, J. K. Gupta, L. D. Sharma, G. M. Dhar, Effect of Zr-SBA-15 support on catalytic functionalities of Mo, CoMo, NiMo hydrotreating catalysts, Catal. Today. 130 (2008) 302-308]. In several countries, sulfur content must be reduced in fuels such as gasoline and diesel to 5-15 ppm levels to comply with environmental regulations [M. Breysse, P. Afanasiev, C. Geantet, M. Vrinat, Overview of support effects in hydrotreating catalysts, Catal. Today. 86 (2003) 5-16; and Y. Dong, Y. Xu, Y. Zhang, X. Lian, X. Yi, Y. Zhou, W. Fang, Synthesis of hierarchically structured alumina support with adjustable nanocrystalline aggregation towards efficient hydrodesulfurization, Appl. Catal. A Gen. 559 (2018) 30-39]. This can be achieved through hydrotreatment of petroleum fractions using suitable catalytic materials.

Vigorous research efforts have been devoted to development of HDS catalysts, especially those used for hydrotreating diesel [A. Stanislaus, A. Marafi, M. S. Rana, Recent advances in the science and technology of ultra-low sulfur diesel (ULSD) production, Catal. Today. 153 (2010) 1-68, incorporated herein by reference in its entirety]. An appropriate catalyst support may enhance catalytic active sites and thus provide an efficient HDS catalyst [G. I. Danmaliki, T. A. Saleh, Effects of bimetallic Ce/Fe nanoparticles on the desulfurization of thiophenes using activated carbon, Chem. Eng. J. 307 (2017) 914-927, incorporated herein by reference in its entirety]. Selecting a suitable support material is an important strategy for improving catalyst activity including adequate acidity, good selectivity, optimal metal-support interaction as well as proper textural properties.

It has been reported that mixed oxide supports may improve catalyst textural properties and thus enhance the interaction between metals [S. K. Bej, S. K. Maity, U. T. Turaga, Catalyst: A Review of Recent Studies, Energy & Fuels. 18 (2004) 1227-1237, incorporated herein by reference in its entirety]. Sol-gel method have been used for preparing mixed oxide supports [S. Soisuwan, J. Panpranot, D. L. Trimm, P. Praserthdam, A study of alumina-zirconia mixed oxides prepared by the modified Pechini method as Co catalyst supports in CO hydrogenation, Appl. Catal. A Gen. 303 (2006) 268-272, incorporated herein by reference in its entirety]. In addition, macroporous mixed oxide materials were prepared by methods such as homogeneous precipitation [F. Trejo, M. S. Rana, J. Ancheyta, Genesis of acid-base support properties with variations of preparation conditions: Cumene cracking and its kinetics, Ind. Eng. Chem. Res. 50 (2011) 2715-2725, incorporated herein by reference in its entirety] and homogeneous delayed precipitation in which ammonia was used as a precipitant [M. S. Rana, M. L. Huidobro, J. Ancheyta, M. T. Gomez, Effect of support composition on hydrogenolysis of thiophene and Maya crude, Catal. Today. 107-108 (2005) 346-354, incorporated herein by reference in its entirety].

Alumina has been used widely as a support for dispersing active metal species including molybdenum and cobalt. However, excessive interaction between alumina and active metal species could have a detrimental effect on the efficiency of promoters (i.e. secondary metal species) [M. Breysse, P. Afanasiev, C. Geantet, M. Vrinat, Overview of support effects in hydrotreating catalysts, Catal. Today. 86 (2003) 5-16, incorporated herein by reference in its entirety].

In view of the forgoing, one objective of the present disclosure is to provide a molybdenum based catalyst with cobalt and/or vanadium as a promoter disposed on titania-modified zeolite. A further objective of the present disclosure is to provide a method for making the molybdenum based catalyst and a process of desulfurizing a hydrocarbon feedstock catalyzed by the molybdenum based catalyst.

BRIEF SUMMARY OF THE INVENTION

According to a first aspect, the present disclosure relates to a Mo-based hydrodesulfurization catalyst containing a support material including a titania-modified zeolite, and a catalytic material disposed on the support material, wherein (i) the catalytic material contains molybdenum and at least one promoter, (ii) the support material has a weight ratio of zeolite to titania in a range of 5:1 to 25:1, and (iii) the Mo-based hydrodesulfurization catalyst has a molybdenum content in a range of 10-25 wt % relative to a total weight of the Mo-based hydrodesulfurization catalyst.

In one embodiment, the support material has a Si:Al weight ratio of 2:1 to 3:1, and a Si:Ti weight ratio of 3:2 to 7:1.

In one embodiment, the at least one promoter includes cobalt, vanadium, or both.

In one embodiment, the at least one promoter includes cobalt, and the Mo-based hydrodesulfurization catalyst has a cobalt content in a range of 1-5 wt % relative to a total weight of the Mo-based hydrodesulfurization catalyst.

In one embodiment, the at least one promoter includes vanadium, and the Mo-based hydrodesulfurization catalyst has a vanadium content in a range of 0.5-4 wt % relative to a total weight of the Mo-based hydrodesulfurization catalyst.

In one embodiment, the at least one promoter includes cobalt and vanadium.

In one embodiment, the Mo-based hydrodesulfurization catalyst has a BET surface area in a range of 180-250 m$^2$/g.

In one embodiment, the Mo-based hydrodesulfurization catalyst has a total pore volume of 0.15-0.195 cm$^3$/g, and an average pore size of 3-5 nm.

According to a second aspect, the present disclosure relates to a method of preparing the Mo-based hydrodesulfurization catalyst where the at least one promoter includes cobalt and vanadium. The method involves the steps of (i) mixing a zeolite and titania in a first solvent in the presence of polyvinylpyrrolidone to form a reaction slurry, (ii) heating the reaction slurry to form a support material comprising a titania-modified zeolite, (iii) mixing the support material, a molybdenum precursor, a cobalt precursor, and a vanadium precursor in a second solvent to form a reaction mixture, (iv) drying the reaction mixture to form a dried mass, and (v) calcining the dried mass, thereby forming the Mo-based hydrodesulfurization catalyst.

In one embodiment, the reaction slurry is heated at a temperature of 80-200° C. for 2-10 hours.

In one embodiment, the dried mass is calcined at a temperature of 250-500° C. for 0.5-6 hours.

In one embodiment, the molybdenum precursor is ammonium molybdate(VI).

In one embodiment, the cobalt precursor is cobalt(II) nitrate, and the vanadium precursor is vanadium(V) pentoxide.

In one embodiment, the first solvent and the second solvent independently include water, an alcohol, or both.

According to a third aspect, the present disclosure relates to a method for desulfurizing a hydrocarbon feedstock containing a sulfur-containing compound. The method involves contacting the hydrocarbon feedstock with the Mo-based hydrodesulfurization catalyst in the presence of H$_2$ gas to convert at least a portion of the sulfur-containing compound into a mixture of H$_2$S and a desulfurized product, and removing the H$_2$S from the mixture, thereby forming a desulfurized hydrocarbon stream.

In one embodiment, the hydrocarbon feedstock is contacted with the Mo-based hydrodesulfurization catalyst at a temperature in a range of 150 to 600° C. for 0.1-10 hours.

In one embodiment, a pressure of the H$_2$ gas is in a range of 25 to 100 bars.

In one embodiment, the sulfur-containing compound is present in the hydrocarbon feedstock at a concentration of 0.01-10% by weight relative to a total weight of the hydrocarbon feedstock.

In one embodiment, the sulfur-containing compound is at least one selected from the group consisting of a sulfide, a disulfide, a thiophene, a benzothiophene, and a dibenzothiophene.

In one embodiment, the sulfur content of the desulfurized hydrocarbon stream is 50-99% by weight less than that of the hydrocarbon feedstock.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
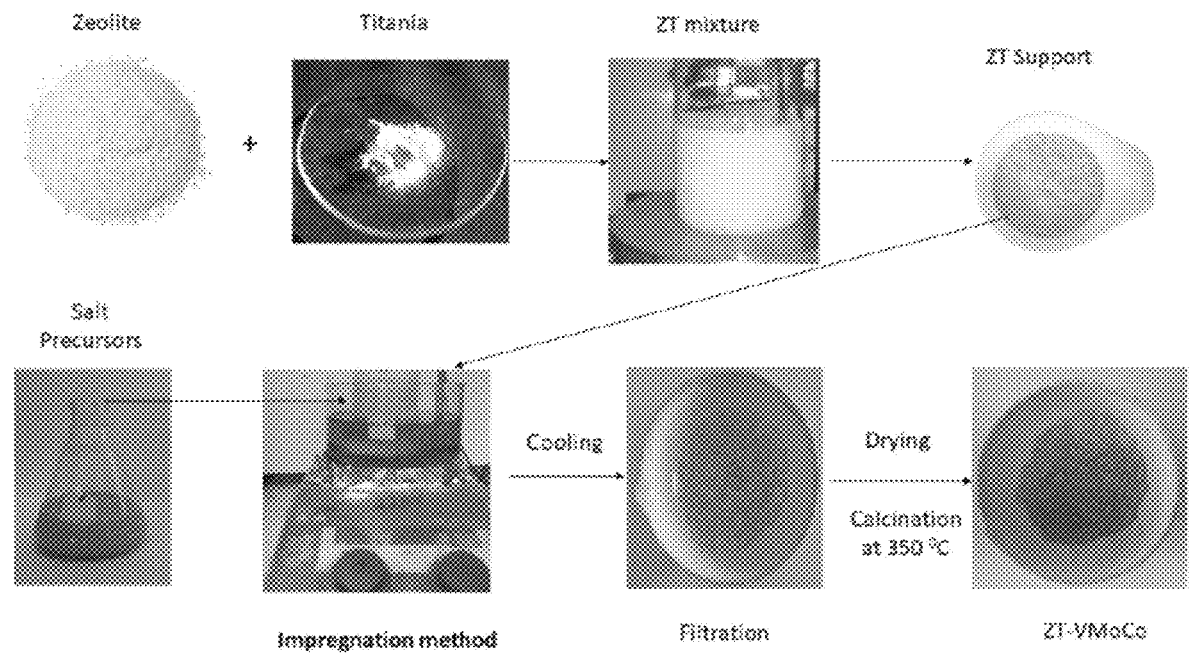
FIG. 1A is a schematic illustration showing the stepwise preparation of Mo-based hydrodesulfurization catalyst.
Figure 1B:
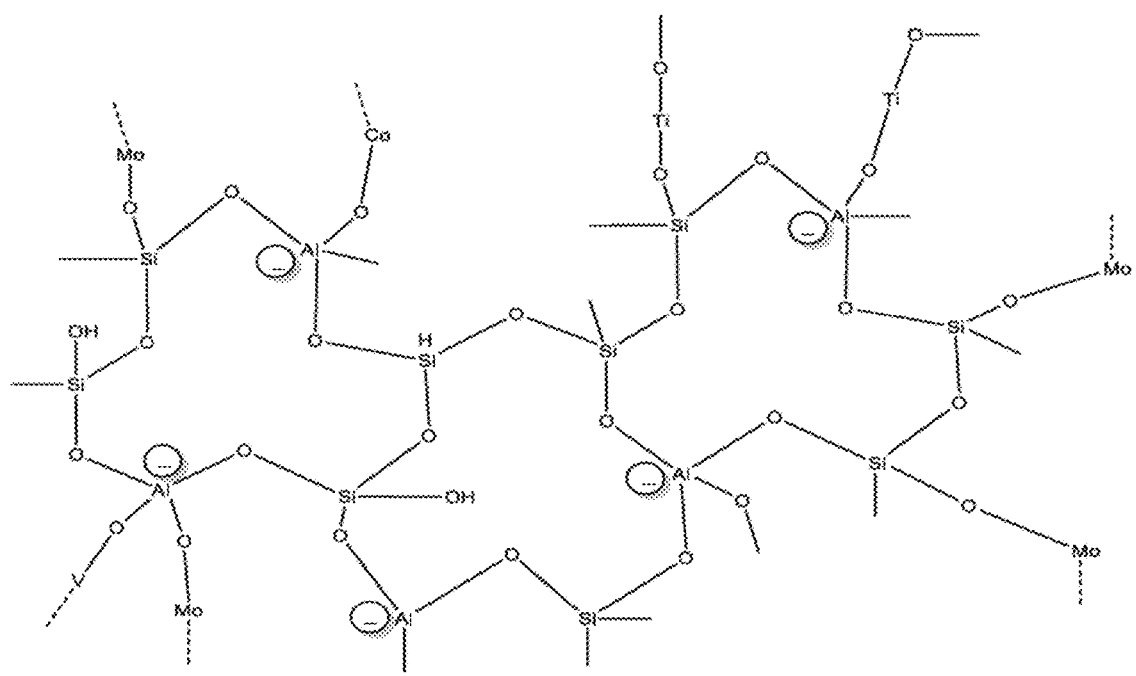
FIG. 1B is a proposed structure of Mo-based hydrodesulfurization catalyst.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, "compound" and "precursor" are intended to refer to a chemical entity, whether as a solid, liquid, or gas, and whether in a crude mixture or isolated and purified.

The present disclosure includes all hydration states of a given salt or formula, unless otherwise noted. For example, cobalt(II) nitrate includes anhydrous $Co(NO_3)_2$, hexahydrate $Co(NO_3)_2 \cdot 6H_2O$, and any other hydrated forms or mixtures. Ammonium heptamolybdate(VI) includes anhydrous $(NH_4)_6Mo_7O_{24}$, and hydrated forms such as ammonium heptamolybdate tetrahydrate $(NH_4)_6Mo_7O_{24} \cdot 4H_2O$.

The present disclosure is intended to include all isotopes of atoms occurring in the present catalysts. Isotopes include those atoms having the same atomic number but different mass numbers. By way of general example, and without limitation, isotopes of hydrogen include deuterium and tritium, isotopes of carbon include $^{12}C$, $^{13}C$, and $^{14}C$, isotopes of oxygen include $^{16}O$, $^{17}O$, and $^{18}O$, and isotopes of molybdenum include $^{92}Mo$, $^{94-98}Mo$, and $^{100}Mo$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to a first aspect, the present disclosure relates to a Mo-based hydrodesulfurization catalyst containing (i) a support material including a titania-modified zeolite, and (ii) a catalytic material disposed on the support material, wherein the catalytic material contains molybdenum and at least one promoter.

As used herein, a support material refers to a material, usually a solid with a high surface area, to which a catalyst is affixed. The reactivity of heterogeneous catalyst and nanomaterial based catalysts occurs at the surface atoms. Thus, great effort is made herein to maximize the surface of a catalyst by distributing it over the support material. The support material may be inert or participate in the catalytic reactions. The support materials used in catalyst preparation play a role in determining the physical characteristics and performance of the catalysts. In one embodiment, a zeolite, preferably a titania-modified zeolite serves as a support material in the presently disclosed Mo-based hydrodesulfurization catalyst.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the individual components. In one embodiment, the support material comprising the titania-modified zeolite is a composite material.

As used herein, a zeolite refers to a microporous aluminosilicate mineral. Many zeolites occur naturally but are also produced industrially on a large scale. Zeolites are crystalline solid structures made of silicon, aluminum, and oxygen that form a framework with cavities and channels inside where cations, water, and/or small molecules may reside. Zeolites have a porous structure that can accommodate a wide variety of cations, such as $Na^+$, $K^+$, $Ca^{2+}$, $Mg^{2+}$ and others. These positive ions are rather loosely held and can readily be exchanged for others in a contact solution. Alternatively, zeolites are the aluminosilicate members of the family of microporous solids known as "molecular sieves". Several varied unique zeolite frameworks have been discovered, at present there are nearly 200 unique zeolite frameworks identified and over 40 naturally occurring zeolite frameworks are known. Zeolites are crystalline materials that afford molecular sized frames and pores, the major building units of zeolites are $[SiO_4]^{4-}$ and $[AO_4]^{5-}$ tetrahedra. Zeolites are crystalline aluminosilicates with open three-dimensional framework structures built of $SiO_4$ and $AlO_4$ tetrahedra linked to each other by sharing all the oxygen atoms to form regular intra-crystalline cavities and channels of molecular dimensions. In a defining feature zeolite frameworks are made up of 4-coordinated atoms forming tetrahedra. These tetrahedra are linked together by their corners leading to a wide variety of structures. These units can link in several ways, resulting in arrays producing three-dimensional anionic networks. The extra negative charge on $[AlO_4]^{5-}$ tetrahedra is counter balanced by a cation, maintaining the overall neutrality of the zeolite. The framework structure may contain linked cages, cavities, and/or channels which are big enough for small molecules to enter and/or occupy.

Various types of zeolite have been used as acidic support for molybdenum-based catalysts, which exhibited good HDS activity towards refractory sulfur in addition to resistance towards $H_2S$ [X. Rozanska, X. Saintigny, R. A. Van Santen, S. Clemendot, F. Hutschka, A theoretical study of hydrodesulfurization and hydrogenation of dibenzothiophene catalyzed by small zeolitic cluster, J. Catal. 208 (2002) 89-99; and X. Rozanska, R. A. Van Santen, F. Hutschka, J. Hafner, A periodic DFT study of the isomerization of thiophenic derivatives catalyzed by acidic mordenite, J. Catal. 205 (2002) 388-397, each incorporated herein by reference in their entirety]. Due to rapid deactivation of gas oil acidic site and extensive cracking, unmodified zeolite has been used as a hydrodesulfurizing agent for hydrodesulfurization of dibenzothiophene (DBT) via direct desulfurization (DDS) or hydrogenation (HYD) route [F.

Bataille, J. L. Lemberton, G. Pérot, P. Leyrit, T. Cseri, N. Marchal, S. Kasztelan, Sulfided Mo and CoMo supported on zeolite as hydrodesulfurization catalysts: Transformation of dibenzothiophene and 4,6-dimethyldibenzothiophene, Appl. Catal. A Gen. 220 (2001) 191-205; and L. Ding, Y. Zheng, Z. Zhang, Z. Ring, J. Chen, HDS, HDN, HDA, and hydrocracking of model compounds over Mo—Ni catalysts with various acidities, Appl. Catal. A Gen. 319 (2007) 25-37, each incorporated herein by reference in their entirety]. Acidic zeolite modified with conventional support may offer desirable catalyst properties with promising deep HDS performance [I. Mochida, K. Sakanishi, X. Ma, S. Nagao, T. Isoda, Deep hydrodesulfurization of diesel fuel: Design of reaction process and catalysts, Catal. Today. 29 (1996) 185-189; R. Shafi, G. J. Hutchings, Hydrodesulfurization of hindered dibenzothiophenes: an overview, Catal. Today. 59 (2000) 423-442; F. Richard, T. Boita, G. Pérot, Reaction mechanism of 4,6-dimethyldibenzothiophene desulfurization over sulfided NiMoP/Al2O3-zeolite catalysts, Appl. Catal. A Gen. 320 (2007) 69-79; T. Klimova, J. Reyes, O. Gutierrez, L. Lizama, Novel bifunctional NiMo/Al-SBA-15 catalysts for deep hydrodesulfurization: Effect of support Si/Al ratio, Appl. Catal. A Gen. 335 (2008) 159-171; and M. A. Al-Daous, S. A. Ali, Deep desulfurization of gas oil over NiMo catalysts supported on alumina-zirconia composites, Fuel. 97 (2012) 662-669, each incorporated herein by reference in their entirety]. A physical mixture of USY zeolite and alumina was tested as a support for NiMoS catalyst possessing high HDS activity [Y. K. Lee, Y. Shu, S. T. Oyama, Active phase of a nickel phosphide (Ni2P) catalyst supported on KUSY zeolite for the hydrodesulfurization of 4,6-DMDBT, Appl. Catal. A Gen. 322 (2007) 191-204; H. Mizutani, H. Godo, T. Ohsaki, Y. Kato, T. Fujikawa, Y. Saih, T. Funamoto, K. Segawa, Inhibition effect of nitrogen compounds on CoMoP/Al$_2$O$_3$ catalysts with alkali or zeolite added in hydrodesulfurization of dibenzothiophene and 4,6-dimethyldibenzothiophene, Appl. Catal. A Gen. 295 (2005) 193-200; D. A. Solis-Casados, T. Klimova, R. Cuevas, J. Ramirez, A. López-Agudo, Hydrodesulfurization of gasoils over NiMo/Al$_2$O$_3$—H(or Ni)NaY zeolite hybrid catalysts, Catal. Today. 98 (2004) 201-206; D. A. Solis-Casados, A. L. Agudo, J. Ramirez, T. Klimova, Hydrodesulfurization of hindered dibenzothiophenes on bifunctional NiMo catalysts supported on zeolite-alumina composites, Catal. Today. 116 (2006) 469-477; and K. A. Nadeina, O. V. Klimov, I. G. Danilova, V. Y. Pereyma, E. Y. Gerasimov, I. P. Prosvirin, A. S. Noskov, Amorphous silica-alumina—perspective supports for selective hydrotreating of FCC gasoline: Influence of Mg, Appl. Catal. B Environ. 223 (2018) 22-35, each incorporated herein by reference in their entirety].

In terms of the present disclosure, a variety of zeolite mineral species may be suitable. The zeolite structural group (Nickel-Strunz classification) includes, but is not limited to, 09.GA zeolites, 09.GB zeolites, 09.GC zeolites, 09.GD zeolites, 09.GE zeolites and mixtures thereof. The 09.GA zeolites with $T_5O_{10}$ units (T=combined Si and Al) are known as the fibrous zeolites and include, but are not limited to, the natrolite framework (NAT; gonnardite, natrolite, mesolite, paranatrolite, scolecite, tetranatrolite), the edingtonite framework (EDI; edingtonite, kalborsite), the thomsonite framework (THO; thomsonite series), and mixtures thereof. The 09.GB zeolites with chains of single connected 4-membered rings include, but are not limited to, the analcime framework (ANA; analcime, leucite, pollucite, wairakite), laumontite (LAU), yugawaralite (YUG), goosecreekite (GOO), montesommaite (MON), and mixtures thereof. The 09.GC zeolites with chains of doubly connected 4-membered rings include, but are not limited to, the phillipsite framework (PHI; harmotome, phillipsite series), the gismondine framework (GIS; amicite gismondine, garronite, gobbinsite), boggsite (BOG), merlinoite (MER), the mazzite series (MAZ), the paulingite series (PAU), perlialite (Linde type L framework, zeolite L, LTL), and mixtures thereof. The 09.GD zeolites with chains of 6-membered rings are known as tabular zeolites and include, but are not limited to, the chabazite framework (CHA; chabazite series, herschelite, willhendersonite, SSZ-13), the faujasite framework (FAU; faujasite series, Linde type X, zeolite X, X zeolites, Linde type Y, zeolite Y, Y zeolites), the mordenite framework (MOR; maricopaite, mordenite), the offretite-wenkite subgroup 09.GD.25 such as offretite (OFF) and wenkite (WEN), bellbergite (TMA-E, Aiello and Barrer, framework type EAB), bikitaite (BIK), the erionite series (ERI), ferrierite (FER), gmelinite (GME), the levyne series (LEV), the dachiardite series (DAC), epistilbite (EPI), and mixtures thereof. The 09.GE zeolites with chains of $T_{10}O_{20}$ tetrahedra (T=combined Si and Al) include, but are not limited to, the heulandite framework (HEU; clinoptilolite, heulandite series), the stilbite framework (STI; barrerite, stellerite, stilbite series); brewsterite framework (BRE; brewsterite series), and mixtures thereof. Other acceptable structural group frameworks may include, but are not limited to, cowlesite, pentasil (also known as ZSM-5, framework type MFI), tschernichite (beta polymorph A, disordered framework, BEA), Linde type A framework (zeolite A, LTA), and the like. In one embodiment, the titania-modified zeolite involves one or more zeolites with a 09.GA, 09.Gb, 09.GC, 09.GD, or 09.GE structural group framework.

Often zeolites can be classified into groups according to the Si/Al ratio in their frameworks: i) "low silica" or aluminum rich zeolites A and X (silica to alumina molar ratio Si/Al~1), ii) "intermediate silica" zeolites such as for example zeolite Y, mordenite, zeolite L, and natural zeolites (silica to alumina molar ratio Si/Al 2 to 5), and iii) "high silica" zeolites such as zeolite beta and ZSM-5 (silica to alumina molar ratio Si/Al>10).

The "low silica" zeolites represent a fortunate balance of composition, pore volume, and channel structure. These zeolites are nearly "saturated" in aluminum in the framework composition with a molar ratio of Si/Al from about 1 to about 1.5, which is considered the highest aluminum content possible in tetrahedral aluminosilicate frameworks. Consequently, they contain the maximum number of cation exchange sites balancing the framework aluminum, and thus the highest cation contents and exchange capacities. These compositional characteristics provide one of the most highly heterogeneous surfaces known among porous materials, due to exposed cationic charges nested in an aluminosilicate framework which results in high field gradients. Their surfaces are highly selective for water, polar, and polarizable molecules. The "intermediate silica" zeolites represent superior stability characteristics reflecting higher Si/Al molar ratios (2-5, preferably 2.5-4, preferably 3-3.5) that improve both thermal and acid stability as aluminum positions in the zeolite frameworks pose a site of instability to attack by acid and water vapor. In addition to improvement in stability the difference in composition and structures provide additional catalysis benefits. The "high silica" zeolites are zeolites with molar Si/Al ratios from 10 to 100 or higher, with distinct surface characteristics. In contrast to the "low" and "intermediate" silica zeolites, representing heterogeneous hydrophilic surfaces within a porous crystal, the surface of the high silica zeolites is more homogeneous with an organophilic-hydrophobic selectivity. They generally strongly adsorb the less polar organic molecules and only weakly interact with water and other polar molecules. In one embodiment, the titania-modified zeolite involves a zeolite that is a low silica zeolite, an intermediate silica zeolite, or a high silica zeolite. In a preferred embodiment, the titania-modified zeolite involves a zeolite that is an intermediate silica zeolite with a Si/Al molar ratio ranging from 2 to 5, preferably from 2.1 to 4, more preferably from 2.2 to 2.5.

Recently, materials such as MgO, $ZrO_2$, $TiO_2$, $SiO_2$, carbon, and zeolite have been tested as co-supports for HDS catalysts [J. Ramirez, F. Sánchez-Minero, Support effects in the hydrotreatment of model molecules, Catal. Today. 130 (2008) 267-271; P. Rayo, J. Rami, M. S. Rana, J. Ancheyta, A. Aguilar-elgue, J. Rami, Effect of the Incorporation of Al, Ti, and Zr on the Cracking and Hydrodesulfurization Activity of NiMo/SBA-15 Catalysts Effect of the Incorporation of Al, Ti, and Zr on the Cracking and Hydrodesulfurization Activity of NiMo/SBA-15 Catalysts, Ind. Eng. Chem. Res. 48 (2009) 1242-1248; and F. Trejo, M. S. Rana, J. Ancheyta, CoMo/MgO—$Al_2O_3$ supported catalysts: An alternative approach to prepare HDS catalysts, Catal. Today. 130 (2008) 327-336, each incorporated herein by reference in their entirety]. Compositional modifications of the support may affect the catalytic activity and selectivity. The acidity of HDS catalysts supported by mixed oxide composites promotes hydrodesulfurization activity towards thiophenes [Y. Saih, M. Nagata, T. Funamoto, Y. Masuyama, K. Segawa, Ultra deep hydrodesulfurization of dibenzothiophene derivatives over NiMo/$TiO_2$—$Al_2O_3$ catalysts, Appl. Catal. A Gen. 295 (2005) 11-22; A. Duan, R. Li, G. Jiang, J. Gao, Z. Zhao, G. Wan, D. Zhang, W. Huang, K. H. Chung, Hydrodesulphurization performance of NiW/$TiO_2$—$Al_2O_3$ catalyst for ultra-clean diesel, Catal. Today. 140 (2009) 187-191; and G. Murali Dhar, B. N. Srinivas, M. S. Rana, M. Kumar, S. K. Maity, Mixed oxide supported hydrodesulfurization catalysts—A review, Catal. Today. 86 (2003) 45-60, each incorporated herein by reference in their entirety].

As used herein, titania, also known as titanium dioxide or titanium(IV) oxide, is a naturally occurring or synthetic oxide of titanium with the chemical formula $TiO_2$. Titanium dioxide occurs in nature as the minerals rutile (tetragonal crystal system), anatase (tetragonal crystal system) and brookite (orthorhombic crystal system) and additionally as two high pressure forms, a monoclinic baddeleyite-like form (7 coordinated Ti) and an orthorhombic $\alpha$-$PbO_2$-like form, one known as akaogiite and is an extremely rare mineral. It is mainly source from ilmenite ore or rutile ore. Titanium dioxide has eight modifications, in addition to rutile, anatase, and brookite, three metastable phases can be produced synthetically (monoclinic, tetragonal and orthorhombic), and five high-pressure forms ($\alpha$-$PbO_2$-like, baddeleyite-like, cotunnite-like, orthorhombic OI, and cubic phases) also exist.

Titania has sufficient electrical conductivity with a band gap of about 3.2 eV as well as good redox properties [C. Liu, Z. Zhou, Y. Huang, Z. Cheng, W. Yuan, Support effects on thiophene hydrodesulfurization over Co—Mo—Ni/$Al_2O_3$ and Co—Mo—Ni/$TiO_2$—$Al_2O_3$ catalysts, Chinese J. Chem. Eng. 22 (2014) 383-391, incorporated herein by reference in its entirety]. Incorporation of titania to zeolite as a catalyst support may enhance catalytic capability of HDS catalysts.

The support material of the present disclosure comprises a titania-modified zeolite. In one embodiment, the titania-modified zeolite refers to the aforementioned zeolite that is impregnated with titania. As used herein, "impregnated" means that the titania is incorporated/affixed into the zeolite in any reasonable chemical or physical manner. The titania may be affixed inside of and/or on an outer surface of the zeolite. The titania may be affixed to one or more surfaces of the zeolite, incorporated into the chemical framework of the zeolite, or alternatively, at least partially embedded within cavities and/or pore spaces of the zeolite.

The titania may be incorporated into the crystal framework of the zeolite via chemical bonds such as covalent bonds, ionic bonds, and intermolecular interactions. In one embodiment, the titania-modified zeolite comprises titania incorporated into the crystal structure of the zeolite via —O—Ti—O—Si and/or —Ti—O—Al bonds. In certain embodiments, some of the Al atoms have been replaced by the Ti atoms in the framework of the zeolite.

In one embodiment, the support material of the present disclosure has a weight ratio of zeolite to titania in a range of 5:1 to 25:1, preferably 6:1 to 22:1, preferably 7:1 to 20:1, preferably 8:1 to 18:1, preferably 9:1 to 16:1, preferably 10:1 to 15:1, preferably 12:1 to 14:1. In a related embodiment, the support material has a Si:Al weight ratio ranging from 2:1 to 3:1, preferably from 2.2:1 to 2.8:1, preferably from 2.4:1 to 2.7:1, preferably from 2.5:1 to 2.6:1. In another related embodiment, the support material has a Si:Ti weight ratio ranging from 3:2 to 7:1, preferably 2:1 to 6:1, preferably 5:2 to 5:1, preferably 3:1 to 4:1.

In a preferred embodiment, the Mo-based hydrodesulfurization catalyst of the present disclosure comprises a catalytic material disposed on the support material, wherein the catalytic material contains molybdenum and at least one promoter. As used herein, "disposed on" describes being completely or partially filled throughout, saturated, permeated, and/or infused. The catalytic material may be affixed to the support material in any reasonable manner, such as physisorption or chemisorption and mixtures thereof. The catalytic material may be affixed on one or more surfaces of the support material. The catalytic material may be affixed on an outer surface of the support material or within pore spaces of the support material. In one embodiment, greater than 10% of the surface area (i.e. surface and pore spaces) of the support material is covered by the catalytic material, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99% of the surface area of the support material is covered by the catalytic material.

In one or more embodiments, the Mo-based hydrodesulfurization catalyst has a Mo content in a range of 10-25 wt %, preferably 11-24 wt %, preferably 12-23 wt %, preferably 13-22 wt %, preferably 14-21 wt %, preferably 15-20 wt %, preferably 16-19 wt %, preferably 17-18 wt % relative to a total weight of the Mo-based hydrodesulfurization catalyst. However, in certain embodiments, the Mo-based hydrodesulfurization catalyst has a Mo content that is less than 10 wt % or greater than 25 wt % relative to a total weight of the Mo-based hydrodesulfurization catalyst. Preferably, molybdenum is present in the Mo-based hydrodesulfurization catalyst in oxide forms. Molybdenum oxide may refer to molybdenum(IV) oxide ($MoO_2$), molybdenum(VI) oxide ($MoO_3$). Molybdenum oxide may also refer to a molybdate including, but not limited to, $MoO_4^{2-}$, $Mo_2O_7^{2-}$, $Mo_3O_{10}^{2-}$, $Mo_4O_{13}^{2-}$, $MoO_{16}^{2-}$, $MoO_{19}^{2-}$, $Mo_7O_{24}^{6-}$, and $MoSO_{26}^{4-}$.

However, in certain embodiments, molybdenum may be present in other species such as metallic molybdenum and sulfide forms in the Mo-based hydrodesulfurization catalyst in addition to, or in lieu of molybdenum oxides.

As used herein, a promoter refers to an additive intended to improve catalyst performance. In one or more embodiments, the catalytic material comprises cobalt, vanadium, or both as a promoter.

In one embodiment, when cobalt is present as the promoter, the Mo-based hydrodesulfurization catalyst has a Co content in a range of 1-5 wt % relative to a total weight of the catalyst, preferably 1.5-4.5 wt %, preferably 2-4 wt %, preferably 2.5-3.5 wt %, or about 3 wt % relative to the total weight of the catalyst. Preferably, cobalt is present in the Mo-based hydrodesulfurization catalyst in oxide forms. Cobalt oxide may refer to cobalt(II) oxide (CO), cobalt(III) oxide ($CO_2O_3$), cobalt (II, III) oxide ($CO_3O_4$). Cobalt oxide may also refer to a cobaltate such as $COO_2^-$ and $Co_4O_9^{6-}$. In certain embodiments, cobalt may be present in other species such as metallic cobalt and sulfide forms (e.g. CoS, $CoS_2$, $Co_3S_4$, and $Co_9S_8$) in the Mo-based hydrodesulfurization catalyst in addition to, or in lieu of the cobalt oxides. In at least one embodiment, monoclinic $CoMoO_4$ crystals are present in the Mo-based hydrodesulfurization catalyst.

In one embodiment, when vanadium is present as the promoter, the Mo-based hydrodesulfurization catalyst has a V content in a range of 0.5-4 wt % relative to a total weight of the Mo-based hydrodesulfurization catalyst, preferably 1-3.5 wt %, preferably 1.5-3 wt %, preferably 2-2.5 wt % relative to the total weight of the catalyst. Preferably, vanadium is present in the Mo-based hydrodesulfurization catalyst in oxide forms. Vanadium oxide may refer to vanadium (II) oxide (vanadium monoxide, VO), vanadium(III) oxide (vanadium sesquioxide or trioxide, $V_2O_3$), vanadium (IV) oxide (vanadium dioxide, $VO_2$), vanadium (V) oxide (vanadium pentoxide, $V_2O_5$). Vanadium oxide may also refer to a vanadate, a compound containing an oxoanion of vanadium. Exemplary vanadate ions include, but are not limited to, $VO_4^{3-}$, $V_2O_7^{4-}$, $V_3O_9^{3-}$, $V_4O_{12}^{4-}$, $V_5O_{14}^{3-}$ and the like. In certain embodiments, vanadium may be present in other species such as metallic vanadium and sulfide forms (e.g. VS, $V_2S_3$, $VS_4$) in the Mo-based hydrodesulfurization catalyst in addition to, or in lieu of the vanadium oxides.

Preferably, the catalytic material includes both cobalt and vanadium as the promoter. In one embodiment, a weight ratio of cobalt to vanadium present in the Mo-based hydrodesulfurization catalyst is in a range of 1:4 to 10:1, preferably 1:2 to 8:1, preferably 1:1 to 6:1, preferably 3:2 to 4:1, or about 2:1.

Nanoparticles are particles between 1 and 100 nm in size. The exceptionally high surface area to volume ratio of nanoparticles may cause the nanoparticles to exhibit significantly different or even novel properties from those observed in individual atoms/molecules, fine particles and/or bulk materials. Nanoparticles may be classified according to their dimensions. Three-dimensional nanoparticles preferably have all dimensions of less than 100 nm, and generally encompass isodimensional nanoparticles. Examples of three dimensional nanoparticles include, but are not limited to nanospheres, nanogranules and nanobeads. Two-dimensional nanoparticles have two dimensions of less than 100 nm, generally including diameter. Examples of two-dimensional nanoparticles include, but are not limited to, nanosheets, nanoplatelets, nanolaminas and nanoshells. One-dimensional nanoparticles have one dimension of less than 100 nm, generally thickness. Examples of one-dimensional nanoparticles include, but are not limited to, nanorods, nanotubes, nanofibers and nanowhiskers.

Preferably, the catalytic material described herein that contains aforementioned molybdenum oxides and promoters such as cobalt oxides and/or vanadium oxides is nanostructured. The nanostructured catalytic material may be present in the form of particles of the same shape or different shapes, and of the same size or different sizes. In one or more embodiments, the nanostructured catalytic material is in the form of nanoparticles including one-dimensional, two-dimensional, and/or three-dimensional nanoparticles. The catalytic material nanoparticles may have one or two dimensions greater than 100 nm. In some embodiments, the catalytic material nanoparticles are in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface). In one embodiment, the Mo-based hydrodesulfurization catalyst contains catalytic material nanoparticles with an average particle size of 1-100 nm, preferably 2-80 nm, preferably 5-60 nm, preferably 10-50 nm, preferably 15-40 nm, preferably 18-30 nm, preferably 20-25 nm.

In preferred embodiments, the catalytic material (e.g. molybdenum and a promoter such as cobalt and/or vanadium) is homogeneously distributed throughout the support material. The molybdenum, cobalt, and vanadium species and their distributions on the support material may be identified by techniques including, but not limited to, UV-vis spectroscopy, XRD, Raman spectroscopy, AFM (atomic force microscope), TEM (transmission electron microscopy), and EPR (electron paramagnetic resonance). In one embodiment, greater than 10% of the surface area (i.e. surface and pore spaces) of the support material is covered by the catalytic material, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99% of the support material is covered by the catalytic material.

The Brunauer-Emmet-Teller (BET) theory (S. Brunauer, P. H. Emmett, E. Teller, *J Am. Chem. Soc.* 1938, 60, 309-319, incorporated herein by reference) aims to explain the physical adsorption of gas molecules on a solid surface and serves as the basis for an important analysis technique for the measurement of a specific surface area of a material. Specific surface area is a property of solids which is the total surface area of a material per unit of mass, solid or bulk volume, or cross sectional area. In most embodiments, pore size (i. e. pore diameter), total pore volume, and BET surface area are measured by gas adsorption analysis, preferably $N_2$ adsorption analysis (e.g. $N_2$ adsorption isotherms).

In one or more embodiments, the Mo-based hydrodesulfurization catalyst has a BET surface area in a range of 180-250 $m^2/g$, preferably 190-230 $m^2/g$, more preferably 200-225 $m^2/g$, most preferably 210-215 $m^2/g$. In one embodiment, the inclusion of titania into the support material decreases the BET surface area of the Mo-based hydrodesulfurization catalyst by 10-25% relative to a substantially similar catalyst lacking titania, preferably 15-22%, preferably 17-20% relative to a substantially similar catalyst lacking titania (see Table 1).

The term "microporous" refers to a surface having an average pore diameter of less than 2 nm, while the term "mesoporous" refers to a surface having an average pore diameter of 2-50 nm. In one embodiment, the Mo-based hydrodesulfurization catalyst is mesoporous with an average pore size of 2-10 nm, 3-5 nm, or 3.2-4 nm. In certain embodiments, the Mo-based hydrodesulfurization catalyst also comprises micropores with a pore size less than 2 nm, for example a pore size ranging from 1-1.9 nm, 1.2-1.8 nm, or 1.4-1.6 nm. In a related embodiment, the Mo-based hydrodesulfurization catalyst has a total pore volume of 0.15-0.195 cm$^3$/g, preferably 0.16-0.19 cm$^3$/g, preferably 0.17-0.18 cm$^3$/g. In one embodiment, the inclusion of titania into the support material decreases the pore volume of the Mo-based hydrodesulfurization catalyst by 8-20% relative to a substantially similar catalyst lacking titania, preferably 10-18%, preferably 12-15% relative to a substantially similar catalyst lacking titania (see Table 1 of Example 5).

In one embodiment, the acidity of the Mo-based hydrodesulfurization catalyst of the present disclosure is quantified using temperature-programmed desorption (TPD), preferably ammonia TPD. In one embodiment, the Mo-based hydrodesulfurization catalyst has a total acidity in the range of 5-30 mL of NH$_3$ per gram of catalyst, preferably 10-25 mL of NH$_3$ per gram of catalyst, preferably 15-20 mL of NH$_3$ per gram of catalyst when measured at a temperature of 150-750° C., 180-700° C., or 650-690° C. (see Table 2 of Example 6).

The inclusion of titania into the support material may increase the acidity of the Mo-based hydrodesulfurization catalyst. In one embodiment, the Mo-based hydrodesulfurization catalyst has a total acidity that is 5-96% greater, preferably 10-80% greater, preferably 25-50% greater than a substantially similar catalyst lacking titania (see Table 2).

An average diameter (e.g., average particle size) of the particle, as used herein, and unless otherwise specifically noted, refers to the average linear distance measured from one point on the particle through the center of the particle to a point directly across from it. For a circle, an oval, an ellipse, and a multilobe, the term "diameter" refers to the greatest possible distance measured from one point on the shape through the center of the shape to a point directly across from it. For polygonal shapes, the term "diameter", as used herein, and unless otherwise specified, refers to the greatest possible distance measured from a vertex of a polygon through the center of the face to the vertex on the opposite side.

The Mo-based hydrodesulfurization catalyst may be in the form of particles with an average diameter in a range of 0.01-10 μm, 0.1-5 μm, 0.5-4 μm, or 1-2 μm. In one embodiment, the Mo-based hydrodesulfurization catalyst particles are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In one embodiment, the catalyst particles are monodisperse having a particle size distribution ranging from 80% of the average particle size (e.g. diameter) to 120% of the average particle size, preferably 85-115%, preferably 90-110% of the average particle size. In another embodiment, the Mo-based hydrodesulfurization catalyst particles are not monodisperse.

The Mo-based hydrodesulfurization catalyst particles may be agglomerated or non-agglomerated (i.e., the particles are well separated from one another and do not form clusters). In some embodiments, the Mo-based hydrodesulfurization catalyst particles may cluster and form agglomerates having an average diameter in a range of 0.5-100 μm, 1-50 μm, or 5-20 μm.

The Mo-based hydrodesulfurization catalyst of the present disclosure may be square-shaped, triangle-shaped, rod-like, spherical, or substantially spherical (e.g., oval or oblong shape). In other embodiments, the Mo-based hydrodesulfurization catalyst can be of any shape that provides desired catalytic activity and stability of the Mo-based hydrodesulfurization catalyst. For example, the Mo-based hydrodesulfurization catalyst may be in a form of at least one shape such as a triangle, a square, a sphere, a rod, a disc, and a platelet. In one embodiment, the Mo-based hydrodesulfurization catalyst of the present disclosure is irregular-shaped having sides and angles of unequal length and size (see FIGS. 5C-F).

According to a second aspect, the present disclosure relates to a method of preparing the Mo-based hydrodesulfurization catalyst where the at least one promoter includes cobalt and vanadium. The method involves the steps of (i) mixing a zeolite and titania in a first solvent in the presence of polyvinylpyrrolidone to form a reaction slurry, (ii) heating the reaction slurry to form a support material comprising a titania-modified zeolite, (iii) mixing the support material, a molybdenum precursor, a cobalt precursor, and a vanadium precursor in a second solvent to form a reaction mixture, (iv) drying the reaction mixture to form a dried mass, and (v) calcining the dried mass, thereby forming the Mo-based hydrodesulfurization catalyst.

As used herein, polyvinylpyrrolidone (PVP), also commonly known as polyvidone or povidone, refers to a water soluble polymer obtainable from the monomer N-vinylpyrrolidone. In certain embodiments polyvinylpyrrolidone may refer to cross-linked derivatives, a highly cross-linked modification of polyvinylpyrrolidone (PVP) known as polyvinylpolypyrrolidone (PVPP, crospovidone, crospolividone, or E1202). PVP binds to polar molecules exceptionally well, owing to its polarity. PVP is soluble in water and other polar solvents including alcohols (e.g. methanol and ethanol) as well as more exotic solvents (e.g. deep eutectic solvent and urea). In solution, PVP has excellent wetting properties and readily forms films.

PVP polymers are available in several viscosity grades, ranging from low to high molecular weight and may be supplied in various viscosity grades as a powder and/or aqueous solution. Exemplary suitable commercial grades of polyvinylpyrrolidone include, but are not limited to, PVP K-12, PVP K-15, PVP K-30, PVP K-60, PVP K-90, and PVP K-120. The K-value assigned to various grades of PVP polymer may represent a function of the average molecular weight, the degree of polymerization, and the intrinsic viscosity. The K-values may be derived from viscosity measurements and calculated according to Fikentscher's formula. In a preferred embodiment, the polyvinylpyrrolidone used herein has a K-value in a range of 8-140, preferably 10-100, preferably 15-80, preferably 20-60, preferably 25-40.

Some of the techniques for measuring the molecular weight of various PVP polymer products are based on measuring sedimentation, light scattering, osmometry, NMR spectroscopy, ebulliometry, and size exclusion chromatography for determining absolute molecular weight distribution. By the use of these methods, any one of three molecular weight parameters can be measured, namely the number average (Mn), viscosity average (Mv), and weight average (Mw) molecular weights. As used herein, the mass average molar mass or weight average molar mass (Mw) describes the molar mass of a polymer with some properties dependent on molecular size, so a larger molecule will have a larger contribution than a smaller molecule. In some embodiments, the polyvinylpyrrolidone used herein has a weight average molar mass (Mw) in a range of 3,000-3,000,000 g/mol, preferably 6,000-2,000,000 g/mol, preferably 10,000-1,000,000 g/mol, preferably 15,000-900,000 g/mol, preferably 20,000-500,000 g/mol, preferably 30,000-300,000 g/mol, preferably 30,000-100,000 g/mol, preferably 40,000-80,000 g/mol.

As used herein, the polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. In one embodiment, the polyvinylpyrrolidone used herein has a PDI of up to 6, preferably up to 5, preferably up to 3, preferably up to 2.5, preferably up to 2, preferably up to 1.5, preferably up to 1.25. As used herein, a degree of polymerization (DP) is defined as the number of monomeric units in a macromolecule or polymer. In one embodiment, the polyvinylpyrrolidone used herein has a degree of polymerization of 50-5000, preferably 100-2500, preferably 150-1500, preferably 200-750, preferably 250-300.

The preparation of a support material containing titania-modified zeolite involves the steps of mixing the aforementioned PVP, zeolite, and titania to form a reaction slurry, and heating the reaction slurry, thereby forming the support material. The reaction slurry may further comprise a first solvent including, but are not limited to, water, methanol, ethanol, ethylene glycol, isopropanol, propanol, n-butanol, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), decalin, THF, dioxane, toluene, xylene(s), o-dichlorobenzene, diethyl ether, and methyl t-butyl ether. Preferably, the first solvent is a mixture of water and ethanol in a volume ratio of 50:1 to 1:1, preferably 30:1 to 3:1, more preferably 20:1 to 5:1, or about 10:1.

In a preferred embodiment, 0.5-20 g of polyvinylpyrrolidone is present per liter of the reaction slurry, preferably 0.75-10 g/L, preferably 1-5 g/L, preferably 1.25-2.5 g/L, preferably 1.5-2 g/L, or about 1.8 g of polyvinylpyrrolidone is present per liter of the reaction slurry. The reaction slurry also contains the zeolite and titania in a weight ratio ranging from 5:1 to 25:1, preferably from 6:1 to 22:1, preferably from 7:1 to 20:1, preferably from 8:1 to 18:1, preferably from 9:1 to 16:1, preferably from 10:1 to 15:1, preferably from 12:1 to 14:1.

For the purpose of the present disclosure, a "sol-gel material" is a material prepared via a "sol-gel" process where an oxide network formed through hydrolysis and polycondensation reactions of molecular precursor(s) in a liquid form (sol). In the present case, the molecular precursor is the zeolite and titania. As used herein, the sol-gel process is considered as "an aging process", and the "sol-gel material" obtained may be referred as a "gel". The precursors (e.g. the zeolite and titania) may be mixed and forms a support material after aging. The aforementioned step of preparing the support material containing titania-modified zeolite may involve a sol-gel process.

The reaction slurry may be heated (e.g. aged) at a temperature in a range of 80-200° C., preferably 90-150° C., more preferably 100-120° C., or about 110° C. for 1-24 hours, 2-10 hours, 3-8 hours, or about 5 hours, thereby forming the support material containing titania-modified zeolite. The support material may be washed by ethanol and/or water, and then filtered and dried.

The support material may be mixed with a molybdenum precursor, a cobalt precursor, and a vanadium precursor to form a reaction mixture. The reaction mixture may further comprise a second solvent including, but not limited to, water, methanol, ethanol, ethylene glycol, isopropanol, propanol, n-butanol, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), decalin, THF, dioxane, toluene, xylene(s), o-dichlorobenzene, diethyl ether, and methyl t-butyl ether. Preferably, the second solvent is water. The reaction mixture may further comprise polyvinylpyrrolidone, which can facilitate dispersion of the metal species over the titania-modified zeolite support.

Mixing steps of the present disclosure may be performed via agitation by an agitator, a vortexer, a rotary shaker, a magnetic stirrer, a centrifugal mixer, an overhead stirrer, or a sonicator. In certain embodiments, a reaction slurry or mixture is left to stand (i.e., not agitated).

Preferably, the molybdenum precursor is a Mo(VI) salt. Exemplary suitable Mo(VI) salts include, but are not limited to, ammonium heptamolybdate(VI), ammonium heptamolybdate(VI) tetrahydrate, ammonium molybdate(VI), ammonium phosphomolybdate, ammonium tetrathiomolybdate, sodium molybdate(VI), lithium molybdate(VI), molybdenum(VI) dichloride dioxide, and mixtures thereof. In certain embodiments, a molybdenum salt having a different oxidation state, such as +2 (e.g. molybdenum(II) carboxylates), +3 (e.g. molybdenum(III) chloride), +4 (e.g. molybdenum(IV) carbonate), and +5 (e.g. molybdenum(V) chloride), may be used in addition to or in lieu of the Mo(VI) salt. Alternatively, a molybdenum acid, a molybdenum base may be used in addition to or in lieu of the Mo(VI) salt. In a preferred embodiment, the molybdenum precursor used herein is ammonium heptamolybdate(VI) tetrahydrate.

Preferably, the cobalt precursor is a Co(II) salt. Exemplary Co(II) salts include, but are not limited to, cobalt(II) nitrate, cobalt(II) nitrate hexahydrate, cobalt(II) chloride, cobalt(II) chloride hexahydrate, cobalt(II) acetate, cobalt(II) sulfate, cobalt(II) bromide, cobalt(II) iodide, and mixtures and hydrates thereof. In certain embodiments, a cobalt salt having a different oxidation state, such as +3 (e.g. cobalt(III) fluoride), +5 (e.g. potassium percobaltate), may be used in addition to or in lieu of the Co(II) salt. In a preferred embodiment, cobalt(II) nitrate hexahydrate is used as the cobalt precursor.

The vanadium precursor may be a vanadium(IV), vanadium(V) or vanadium(III) salt. Exemplary vanadium salts include, but are not limited to, ammonium metavanadate in mixtures of water and oxalic acid or methanol and oxalic acid, vanadium(III) acetylacetonate (V(AcAc)$_3$) or vanadyl acetylacetonate (VO(AcAc)$_2$) in toluene, VO(iPrO)$_3$, VO(OC$_2$H)$_3$, or VO(OC$_2$H$_7$)$_3$ in 2-propanol, as well as vanadyl(IV) sulfate, vanadium(V) pentoxide, vanadium oxytripropoxide, tetrakis(diethylamido)vanadium(IV), vanadium(III) chloride, vanadium(IV) chloride, vanadium (III) chloride tetrahydrofuran complex, vanadium(V) oxychloride, vanadium(V) oxyfluoride, and the like. Preferably, the vanadium precursor used herein is vanadium(V) pentoxide. The vanadium salt is preferably phosphorous free.

The manner in which the catalytic material is deposited onto a support material can have an influence on the catalytic properties in the final catalyst. Typically the main method of dispersing catalytic material on support materials is the classic incipient wetness impregnation method in a solvent where the catalytic metal precursors are soluble. The impregnation method is performed by contacting the support with a certain volume of solution containing the dissolved catalytic metal precursors. If the volume of the solution is either equal to or less than the pore volume of the support, the technique is referred to as incipient wetness impregnation. In one embodiment, the method of preparing the Mo-based hydrodesulfurization catalyst involves incipient wetness impregnation.

In one embodiment, the support material is present in the reaction mixture in an amount of 5-120 g/L, preferably 10-60 g/L, preferably 15-40 g/L, preferably 20-30 g/L, or about 24 g/L. In a related embodiment, the reaction mixture has a molybdenum concentration of 1-50 g/L, preferably 2-25 g/L, preferably 4-15 g/L, preferably 5-8 g/L, or about 6.6 g/L. In another related embodiment, the reaction mixture has a cobalt concentration of 0.4-10 g/L, preferably 0.8-8 g/L, preferably 1.2-6 g/L, preferably 1.5-3 g/L, or about 2 g/L. In another related embodiment, the reaction mixture has a vanadium concentration of 0.2-6 g/L, preferably 0.4-3 g/L, preferably 0.8-2 g/L, preferably 1-1.5 g/L, or about 1.12 g/L. In a preferred embodiment, a weight ratio of cobalt to vanadium in the reaction mixture is in a range of 1:4 to 10:1, preferably 1:2 to 8:1, preferably 1:1 to 6:1, preferably 3:2 to 4:1, or about 2:1.

Prior to the mixing step, the titania-modified zeolite support, metal precursors (i.e. Mo(VI), Co(II), and V(V) salts), and optional PVP may be dissolved in the solvent separately to form respective solutions, which are then mixed to form the reaction mixture. In a preferred embodiment, the metal precursors (i.e. Mo(VI), Co(II), and V(V) salts) are dissolved in the solvent to form a first mixture, and a solution containing the titania-modified zeolite support and optional PVP is mixed with the first mixture to form the reaction mixture.

In a preferred embodiment, the mixing is performed at a temperature of 40-150° C., preferably 60-120° C., or about 90° C. for a period of 1-24 hours, preferably 2-18 hours, preferably 4-12 hours, preferably 6-8 hours and optionally with stirring and/or ultrasonication to achieve a homogeneous mixture. After mixing the reaction mixture can be filtered and separated from the solvent, and dried to provide a dried mass. In one embodiment, the reaction mixture is dried via heating at 50-180° C., preferably 70-150° C., more preferably 90-125° C., or about 105° C. for 3-48 hours, preferably 6-36 hours, more preferably 9-12 hours to produce a dried mass. An external heat source, such as an oven, a heating mantle, a water bath, or an oil bath, may be employed to dry the reaction mixture of the present disclosure. Alternatively, the reaction mixture may be air dried. In one embodiment, the reaction mixture is dried via heating in air. Alternatively, the reaction mixture is dried in oxygen-enriched air, an inert gas, or a vacuum.

The dried mass may be calcined to form the Mo-based hydrodesulfurization catalyst. In one embodiment, the dried mass is calcined at a temperature in a range of 200-600° C., preferably 250-500° C., preferably 300-450° C., preferably 350-400° C. for 0.5-8 hours, preferably 1-6 hours, preferably 2-4 hours, or about 3 hours to form the Mo-based hydrodesulfurization catalyst. In a preferred embodiment, the dried mass is calcined in an atmosphere containing an inert gas such as argon (Ar), nitrogen ($N_2$), and helium (He), preferably nitrogen. Calcination can be carried out within shaft furnaces, rotary kilns, multiple hearth furnaces, and/or fluidized bed reactors. The method of preparation of the Mo-based hydrodesulfurization catalyst of the present disclosure is not viewed as particularly limiting. For example, the aforementioned method may be modified slightly to exclude vanadium precursor from the reaction mixture to form a Mo-based hydrodesulfurization catalyst having cobalt as the sole promoter.

According to a third aspect, the present disclosure relates to a method for desulfurizing a hydrocarbon feedstock containing a sulfur-containing compound. The method involves contacting the hydrocarbon feedstock with the Mo-based hydrodesulfurization catalyst disclosed herein in any of its embodiments in the presence of $H_2$ gas to convert at least a portion of the sulfur-containing compound into a mixture of $H_2S$ and a desulfurized product, and removing the $H_2S$ from the mixture, thereby forming a desulfurized hydrocarbon stream.

The hydrocarbon feedstock may be delivered from a hydrocarbon reservoir or directly from an offshore or an onshore well. For example, the hydrocarbon feedstock may be a crude oil that is produced from an oil well, particularly from a sour gas oil well. Alternatively, the hydrocarbon feedstock may be a gaseous stream that is supplied directly from an offshore or an onshore well, or a sulfur-containing liquid or gaseous stream, e.g. gaseous ethane, liquid gasoline, liquid naphtha, etc. in a refinery or a petrochemical plant that needs to be desulfurized.

The hydrocarbon feedstock including a sulfur-containing compound may also include various hydrocarbon compounds such as $C_{1-50}$ hydrocarbon compounds, preferably $C_{2-30}$ hydrocarbon compounds, preferably $C_{3-20}$ hydrocarbon compounds, depending on the origin of the hydrocarbon feedstock. In one embodiment, the hydrocarbon feedstock includes $C_{1-20}$ normal paraffins, e.g. $C_{1-20}$ alkanes, $C_{1-20}$ isoparaffins, $C_{1-20}$ cycloparaffins (i.e. naphthenes) or $C_{1-20}$ cycloparaffins having side chain alkyl groups, $C_{1-20}$ aromatics or $C_{1-20}$ aromatics with side chain alkyl groups.

Exemplary sulfur-containing compounds include, but are not limited to, $H_2S$, elemental sulfur, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, methyl mercaptan, phenyl mercaptan, cyclohexythiol, methyl sulfide, ethyl sulfide, propyl sulfide, isopropyl sulfide, butyl sulfide, secondary dibutyl sulfide, tertiary butyl sulfide, benzothiophene, dibenzothiophene, alkyl benzothiophene, alkyl dibenzothiophene, thiocyclohexane, and/or any combination thereof.

In one or more embodiments, the sulfur-containing compound is at least one selected from the group consisting of a sulfide, a disulfide, a thiophene, a benzothiophene, and a dibenzothiophene. In a preferred embodiment, the sulfur-containing compound is a dibenzothiophene compound. Exemplary dibenzothiophene compounds include, but are not limited to, dibenzothiophene, 4-methyldibenzothiophene, 4,6-dimethyldibenzothiophene, and 4,6-diethyldibenzothiophene. In at least one embodiment, the sulfur-containing compound is dibenzothiophene (DBT).

In one or more embodiments, the sulfur-containing compound may be present in the hydrocarbon feedstock at a concentration of 0.01-10%, preferably at least 0.05%, at least 0.1%, at least 1%, at least 3%, at least 5%, at least 6%, at least 7%, at least 8%, at least 9% by weight, and no more than 10% by weight, relative to a total weight of the hydrocarbon feedstock. In a related embodiment, a concentration of the sulfur-containing compound in the hydrocarbon feedstock is no more than 50,000 ppm, preferably no more than 20,000 ppm, preferably no more than 10,000 ppm, preferably no more than 5,000 ppm, preferably no more than 4,000 ppm, preferably no more than 2,000 ppm. Alternatively, a concentration of sulfur-containing compound in the hydrocarbon feedstock may be in a range of 100 to 10,000 ppm, preferably 200 to 5,000 ppm, preferably 300 to 2,000 ppm, preferably 400 to 1,000 ppm, preferably 500 to 800 ppm.

The hydrocarbon feedstock may be in a liquid state or a gaseous state. In view of that, contacting the hydrocarbon feedstock with the Mo-based hydrodesulfurization catalyst may be different, depending on the state of the hydrocarbon feedstock, i.e. the liquid state or the gaseous state. In one embodiment, the hydrocarbon feedstock is in a liquid state or in a gaseous state and the hydrocarbon feedstock is passed through the Mo-based hydrodesulfurization catalyst via a fixed-bed or a fluidized-bed reactor. In another embodiment, the hydrocarbon feedstock is in a gaseous state and the hydrocarbon feedstock is passed over the Mo-based hydrodesulfurization catalyst, or may stay stagnant over the Mo-based hydrodesulfurization catalyst, i.e. as an atmosphere to the catalyst. Yet in another embodiment, the hydrocarbon feedstock is in a liquid state and the hydrocarbon feedstock is mixed with the Mo-based hydrodesulfurization catalyst to form a heterogeneous mixture in a batch reactor optionally quipped with a rotary agitator.

The hydrocarbon feedstock may be contacted with the Mo-based hydrodesulfurization catalyst in the presence of $H_2$ gas under favorable reaction conditions to convert at least a portion of the sulfur-containing compound into a mixture of $H_2S$ and a desulfurized product. In one embodiment, the hydrocarbon feedstock is contacted with the Mo-based hydrodesulfurization catalyst at a temperature in a range of 100 to 600° C., 150-500° C., 200-400° C., or about 300° C. for 0.1-10 hours, 0.5-8 hours, 1-6 hours, 2-5 hours, or 3-4 hours. In a preferred embodiment, a pressure of the $H_2$ gas is in a range of 20 to 100 bars, preferably 25 to 80 bars, preferably 30 to 70 bars, preferably 35 to 60 MPa, preferably 40 to 55 bars. A volumetric flow ratio of the $H_2$ gas to the hydrocarbon feedstock may vary depending on the type of sulfur-containing compound present in the hydrocarbon feedstock. In some embodiments, the volumetric flow ratio of the $H_2$ gas to the hydrocarbon feedstock is in a range of 100:1 to 1:100, 80:1 to 1:80, 50:1 to 1:50, 40:1 to 1:40, or 30:1 to 1:30.

Figure 13A:
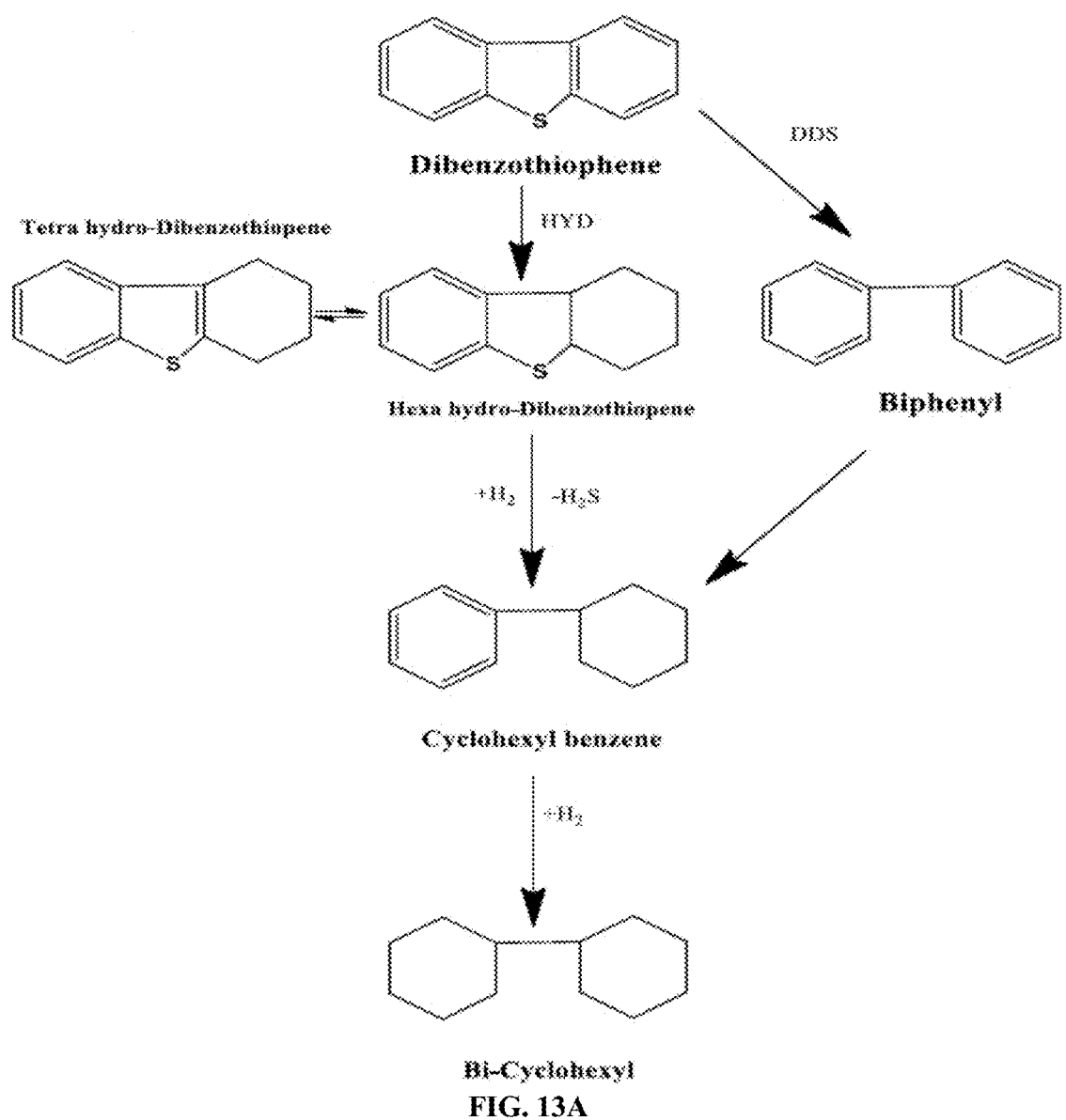
FIG. 13A shows hydrodesulfurization of dibenzothiophene via hydrogenation desulfurization (HYD) pathway.

Under the catalysis of the presently disclosed Mo-based hydrodesulfurization catalyst, the sulfur-containing compound present in the hydrocarbon feedstock may be hydrodesulfurized via more than one reaction pathways, preferably two reaction pathways including i) a direct desulfurization reaction (DDS) or a hydrogenolysis to form biphenyl (BP), whereby C—S bonds are cleaved in a single reaction step (see FIG. 13B), and ii) a hydrogenation reaction (HYD), wherein a complex (e.g. cyclohexyl benzothiophene) is formed initially via hydrogenating the sulfur-containing hydrocarbon compound, and C—S bonds of the complex are cleaved subsequently to form desulfurized products (e.g. cyclohexyl benzene (CHB)) (see FIG. 13A).

In one embodiment, the hydrodesulfurization reaction catalyzed by the Mo-based hydrodesulfurization catalyst predominantly proceeds via the hydrogenation desulfurization (HYD) pathway.

In one embodiment, the contacting converts by weight 50-99.8%, preferably at least 50%, preferably at least 60%, preferably at least 65%, preferably at least 70%, preferably at least 75%, preferably at least 80%, preferably at least 85%, preferably at least 90%, preferably at least 95%, preferably at least 99% of the sulfur-containing compound present in the hydrocarbon feedstock into a mixture of $H_2S$ and a desulfurized product.

The method disclosed herein may include removing the $H_2S$ from the mixture in the presence of an inert gas (e.g. nitrogen) stream to form a desulfurized hydrocarbon stream. "Removing", as used herein, may refer to any process of separating, at least one component from a mixture. Exemplary removing processes include, but are not limited to, distillation, absorption, adsorption, solvent extraction, stripping, and filtration and are well known to those skilled in the art. The removed $H_2S$ may be collected and further supplied to a sulfur manufacturing plant to produce sulfur-containing products.

In one or more embodiments, the sulfur content of the desulfurized hydrocarbon stream is by weight 50-99.8%, preferably at least 55%, preferably at least 60%, preferably at least 65%, preferably at least 70%, preferably at least 75%, preferably at least 80%, preferably at least 85%, preferably at least 90%, preferably at least 95%, preferably at least 99% by weight less than that of the hydrocarbon feedstock prior to the contacting.

The inclusion of titania into the support material may improve the hydrodesulfurization catalytic activity of the Mo-based hydrodesulfurization catalyst. In one embodiment, the sulfur content of the desulfurized hydrocarbon stream of a desulfurization process catalyzed by the Mo-based hydrodesulfurization catalyst is at least 25% by weight less than that of a desulfurization process catalyzed by a substantially similar catalyst lacking titania under substantially identical conditions (e.g. temperature, pressure, time), preferably at least 30%, preferably at least 40%, preferably at least 45%, preferably at least 50%, preferably at least 60%, preferably at least 75% by weight less than that of a desulfurization process catalyzed by the substantially similar catalyst lacking titania under substantially identical conditions (see FIGS. 10 and 11).

The examples below are intended to further illustrate protocols for preparing, characterizing Mo-based hydrodesulfurization catalyst, and uses thereof, and are not intended to limit the scope of the claims.

Example 1

Chemicals and Materials

Cobalt(II) nitrate ($Co(NO_3)_2.6H_2O$, purity 98.5%), ammonium molybdate (($NH_4)_6Mo\ O_{24}.4H_2O$, purity 98.5%), vanadium(V) pentoxide ($V_2O_5$, purity 99.6%), titanium(IV) chloride ($TiCl_4$, purity 99.8%), polyvinylpyrrolidone with linear formula of $(C_6H_9NO)_n$, dibenzothiophene (DBT) ($C_{12}H_8S$, purity 98.4%), decalin ($C_{10}H_{18}$, purity 99.2%), and ethanol ($C_2H_6O$, purity 99%) were purchased from Sigma Aldrich.

Example 2

Catalyst Synthesis

The commercial type of zeolite was mixed with titanium oxide to prepare the composite support of zeolite-titania (ZT). 5.6 g of zeolite and 0.35 g and 0.7 g of titania, for 5% and 10% titania, respectively, were mixed together using the sol-gel method. Specifically, 100 mL of deionized water, 0.2 g of polyvinylpyrrolidone (PVP), and 10 mL ethanol were added to the mixture of zeolite and titania. The mixture was stirred for 1 hour then was refluxed at 110° C. for about 5 hours. The final ZT composite product was filtered and dried at 90° C.

The ZT support was mixed with molybdenum (Mo), cobalt (Co), and vanadium(V) nanoparticles in percentages of 15%, 4%, and 2%, respectively, by the incipient wetness impregnation method. Approximately, 4.75 g of the ZT support was dispersed in 80 mL of deionized water, which was followed by stirring at 90° C. for 45 minutes. Then, 2.43 g of ammonium molybdate, 1.97 g of cobalt(II) nitrate, and 0.4 g of vanadium(V) pentaoxide were dissolved to form 100 mL aqueous solution. This solution was mixed with the dispersed ZT support and the mixture was stirred at 90° C. for 4 hours.

A small amount of PVP was added during the preparation to enhance the dispersion of the nanoparticles on the ZT support. The final catalyst product was filtered and dried at 105° C. for 6 hours. High purity nitrogen medium was used for calcination at 350° C. for 3 hours to yield the catalysts ZTV-5 and ZTV-10. Detailed procedures for the synthesis of ZTV-5 and ZTV-10 are summarized in FIG. 1A. Similar steps have been conducted for the synthesis of zeolite-MoCoV (ZVB) without addition of titania for comparison purposes.

Scanning electron microscope (SEM), temperature programmed desorption (TPD), BET $N_2$ physisorption, powder X-ray diffraction (XRD), electron dispersive spectroscopy (EDS), Fourier transform infrared (FT-IR), and thermogravimetric analysis (TGA) were performed to evaluate the morphological and structural properties of the prepared catalysts.

Example 3

Evaluation of the Catalysts

Figure 2A:
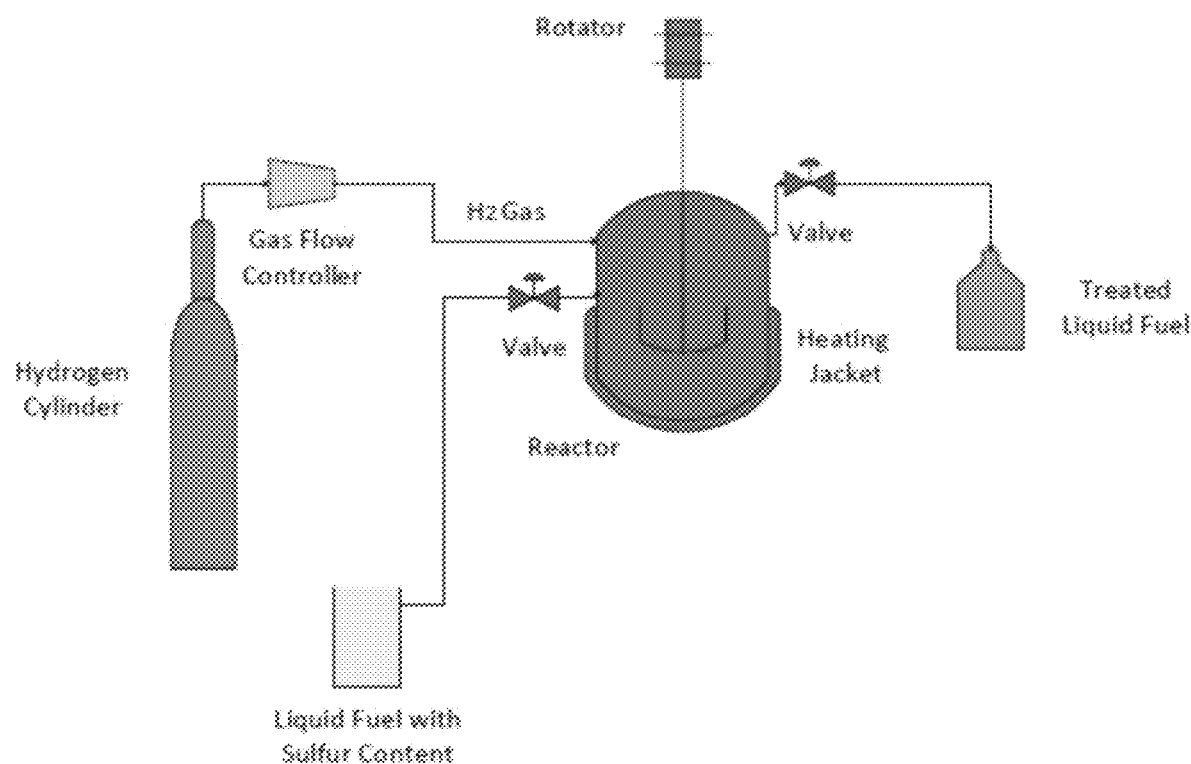
FIG. 2A is a schematic diagram showing experimental set-up of the hydrodesulfurization reaction system.
Figure 2B:
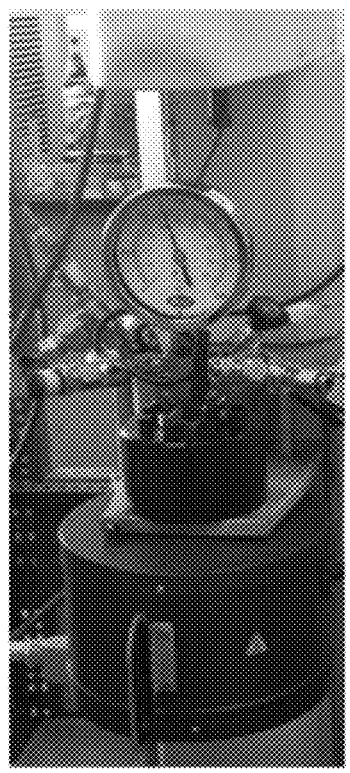
FIG. 2B is a picture showing the experimental set-up of FIG. 2A.

The catalytic activity of the synthesized catalysts (ZVB, ZTV-5 and ZTV-10) towards hydrodesulfurization was investigated using a batch reactor (Parr Instrument, model number 4848B). As shown in FIG. 2A, the components of the hydrodesulfurization system included a reactor, a gas controller, a hydrogen gas supplier, and controlled valves for input and output. The reaction temperature was set at 300° C. and the hydrogen partial pressure was 55 bar. A weighted amount of ZVB, ZTV-5, or ZTV-10 at around 0.50 g was mixed with 100 mL of the model fuel containing DBT at an initial concentration of 550 ppm-S in decalin as a solvent model fuel. The mixture was inserted into the reactor vessel before the catalytic reaction started. The first sample (zero point) was collected as the reaction temperature reached 300° C. Monitoring of the reaction continued for 5 hours and one sample was collected every hour using manual valve. The sulfur concentration for the collected samples was determined using a gas-chromatography sulfur chemiluminescence detector. In the end, sample identification was performed using GC-MS.

Example 4

Composition and Morphology Analysis

Figure 3:
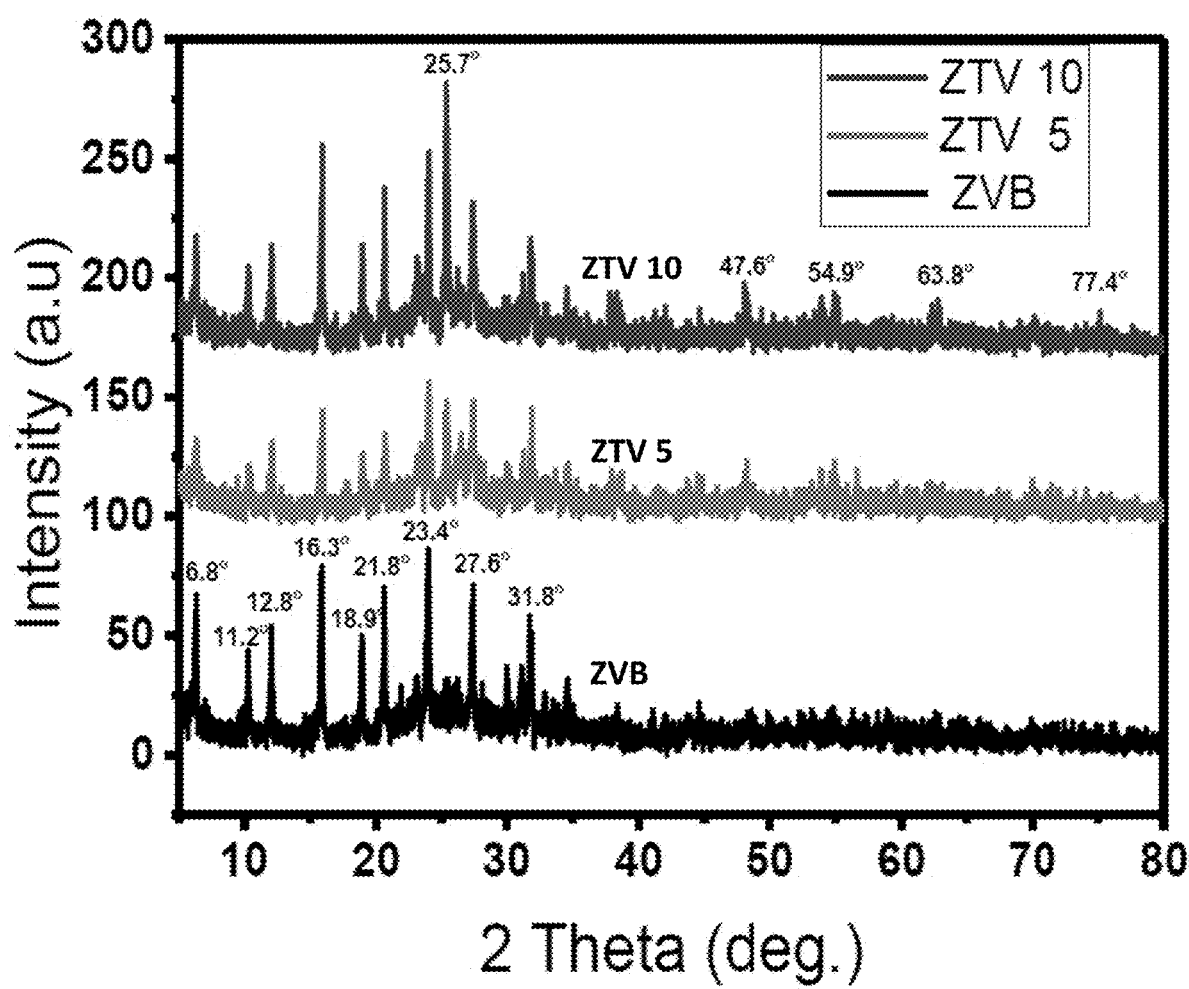
FIG. 3 is an overlay of X-ray diffraction (XRD) patterns of Mo-based hydrodesulfurization catalysts ZTV 5 and ZTV 10 and control catalyst ZVB, respectively (refer to Example 2 for the abbreviation key).

The XRD patterns of the prepared catalysts after calcination at 350° C. were illustrated in FIG. 3. A characteristic peak was observed at 2θ=25.7°, which is specific to titania [X. Rozanska, R. A. Van Santen, F. Hutschka, J. Hafner, A periodic DFT study of the isomerization of thiophenic derivatives catalyzed by acidic mordenite, J. Catal. 205 (2002) 388-397; F. Bataille, J. L. Lemberton, G. Pérot, P. Leyrit, T. Cseri, N. Marchal, S. Kasztelan, Sulfided Mo and CoMo supported on zeolite as hydrodesulfurization catalysts: Transformation of dibenzothiophene and 4,6-dimethyldibenzothiophene, Appl. Catal. A Gen. 220 (2001) 191-205; and L. Ding, Y. Zheng, Z. Zhang, Z. Ring, J. Chen, HDS, HDN, HDA, and hydrocracking of model compounds over Mo—Ni catalysts with various acidities, Appl. Catal. A Gen. 319 (2007) 25-37, each incorporated herein by reference in their entirety]. Noticeable peaks of the diffractogram of ZVB confirmed the existence of $CoMoO_x$ and crystalline molybdenum oxide. Inclusion of cobalt and molybdenum into the catalyst led to a characteristic peak at around 27.6°, which is attributed to monoclinic $CoMoO_4$. The peaks at 31.8°, 39.5°, 47.6°, 54.9°, and 63.8° were assigned to the zeolite material. With the introduction of titania into the zeolite, there was a slight reduction in the peak intensities, indicating good dispersion of the catalyst on the support surface.

Figure 4A:
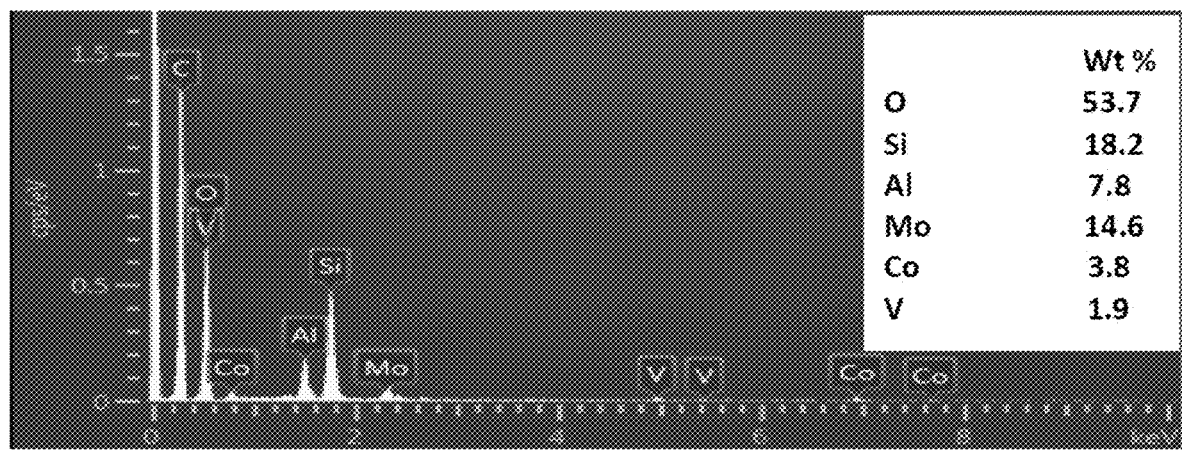
FIG. 4A is an energy-dispersive X-ray (EDX) spectrum of control catalyst ZVB.
Figure 4B:
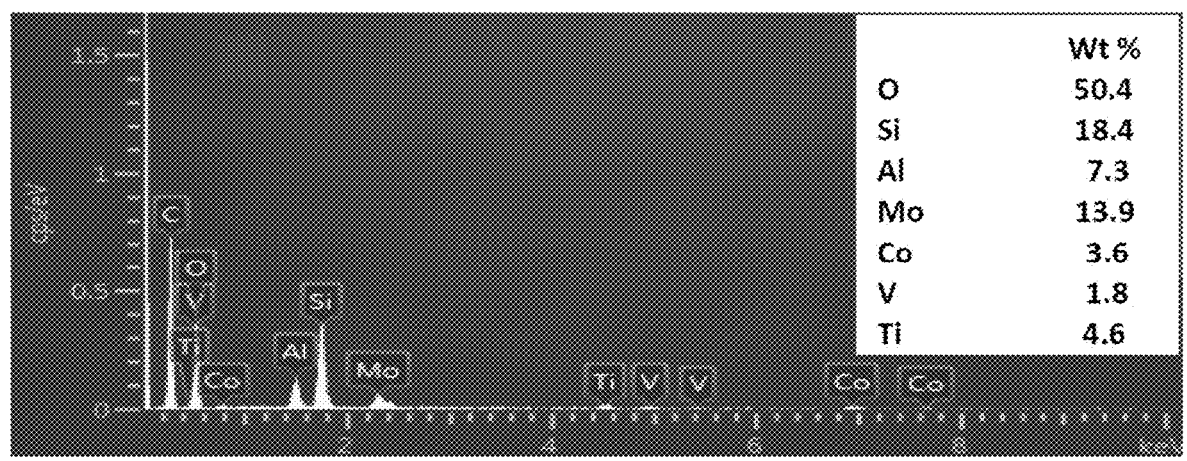
FIG. 4B is an EDX spectrum of Mo-based hydrodesulfurization catalyst ZTV 5.
Figure 4C:
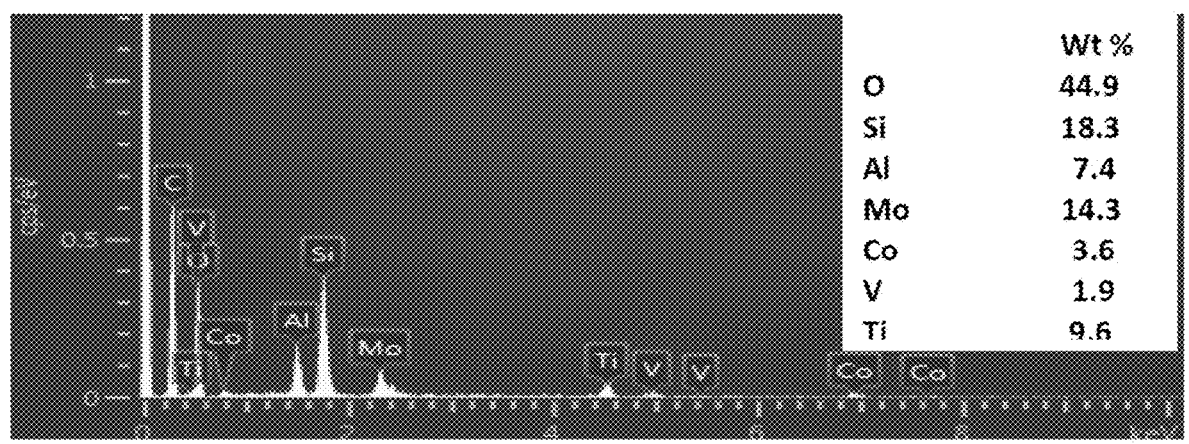
FIG. 4C is an EDX spectrum of Mo-based hydrodesulfurization catalyst ZTV 10.
Figure 5A:
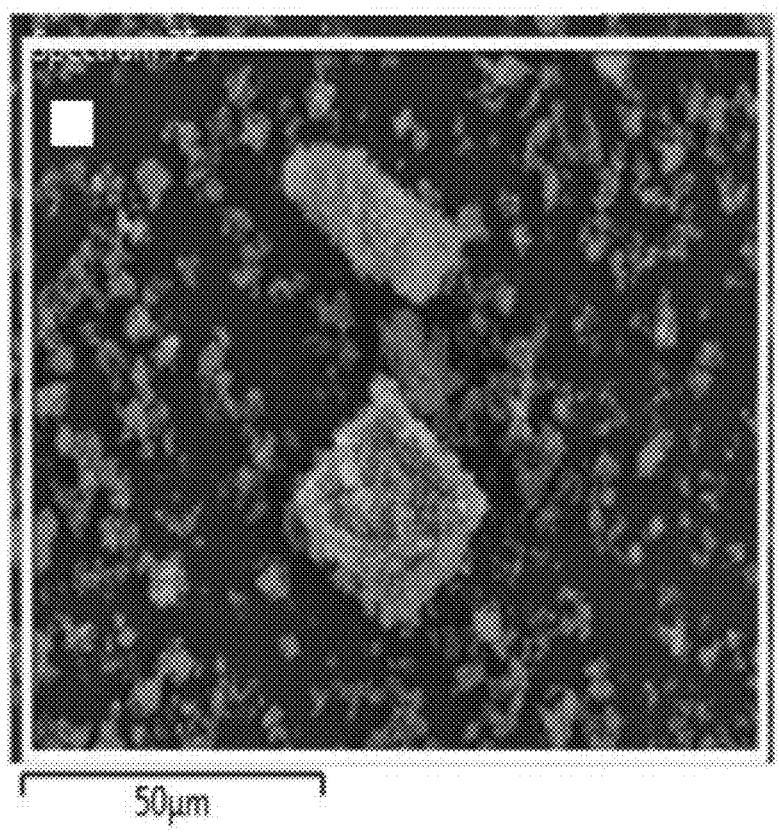
FIG. 5A is a scanning electron microscope (SEM) image (scale bar: 50 µm) of control catalyst ZVB.
Figure 5B:
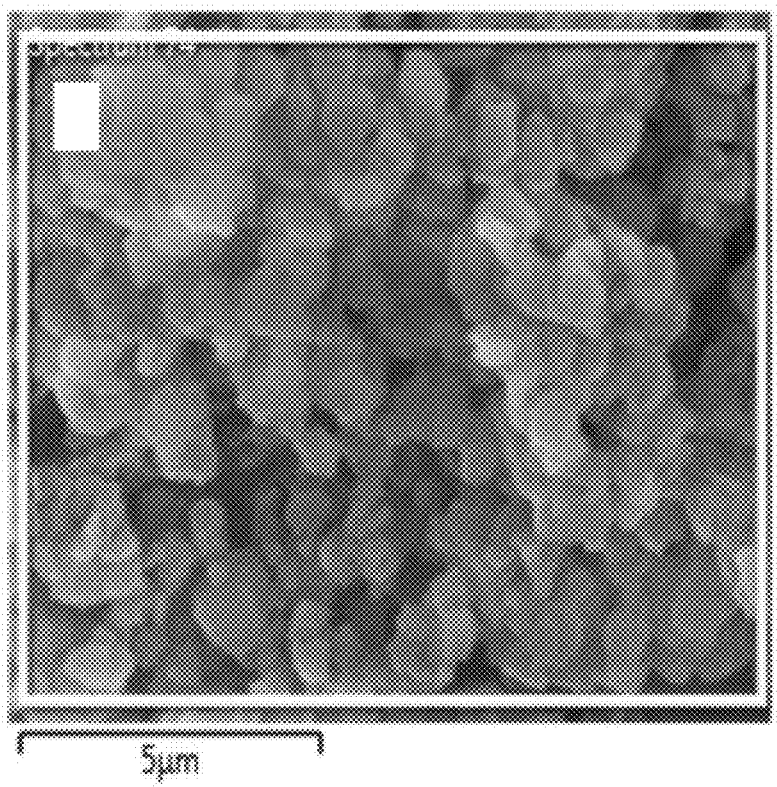
FIG. 5B is a SEM image (scale bar: 5 µm) of control catalyst ZVB.
Figure 5C:
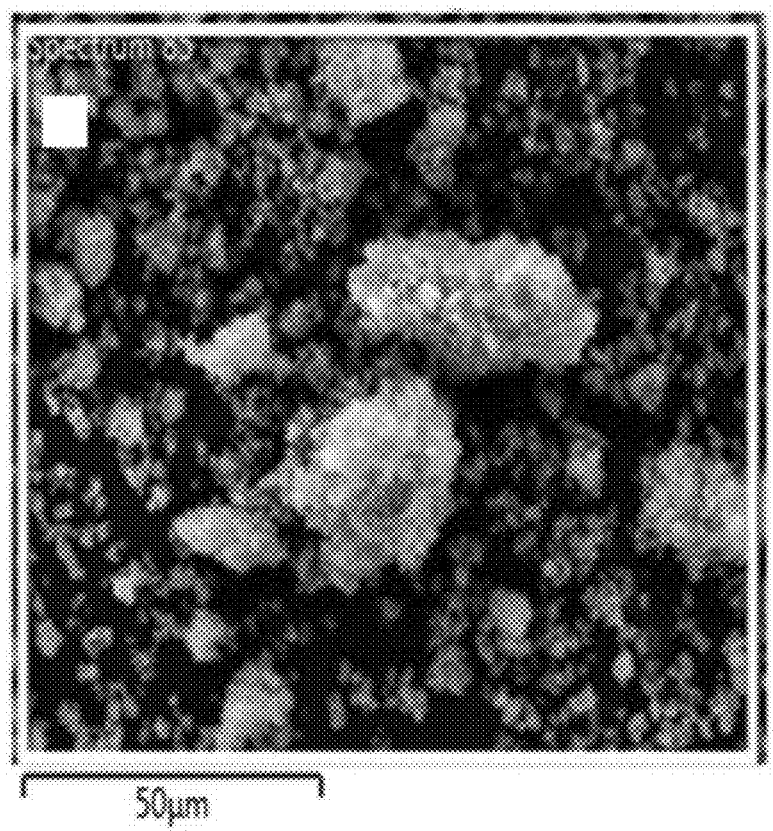
FIG. 5C is a SEM image (scale bar: 50 µm) of Mo-based hydrodesulfurization catalyst ZTV 5.
Figure 5D:
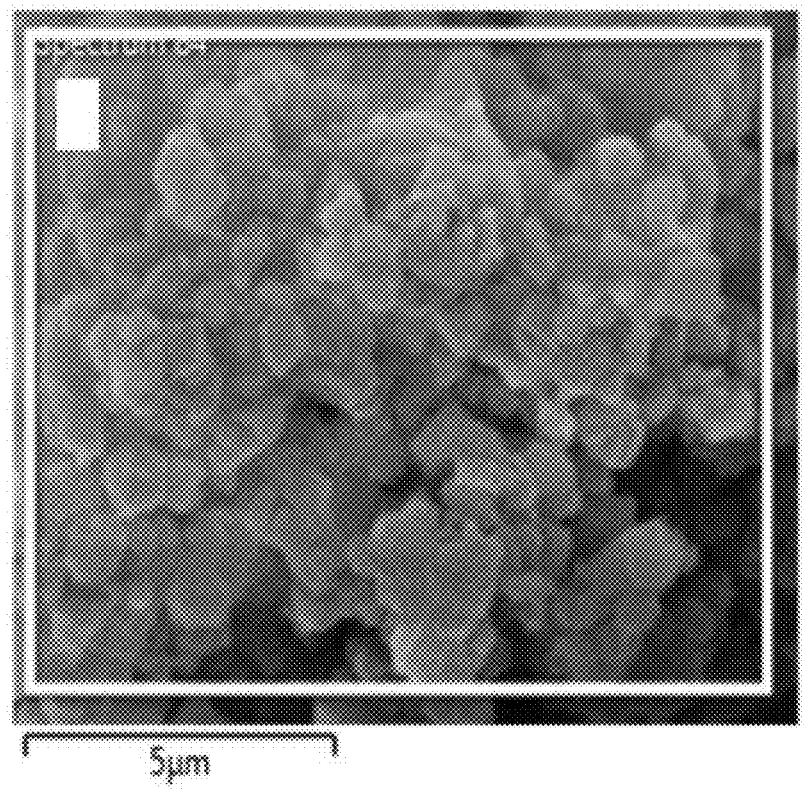
FIG. 5D is a SEM image (scale bar: 5 µm) of Mo-based hydrodesulfurization catalyst ZTV 5.
Figure 5E:
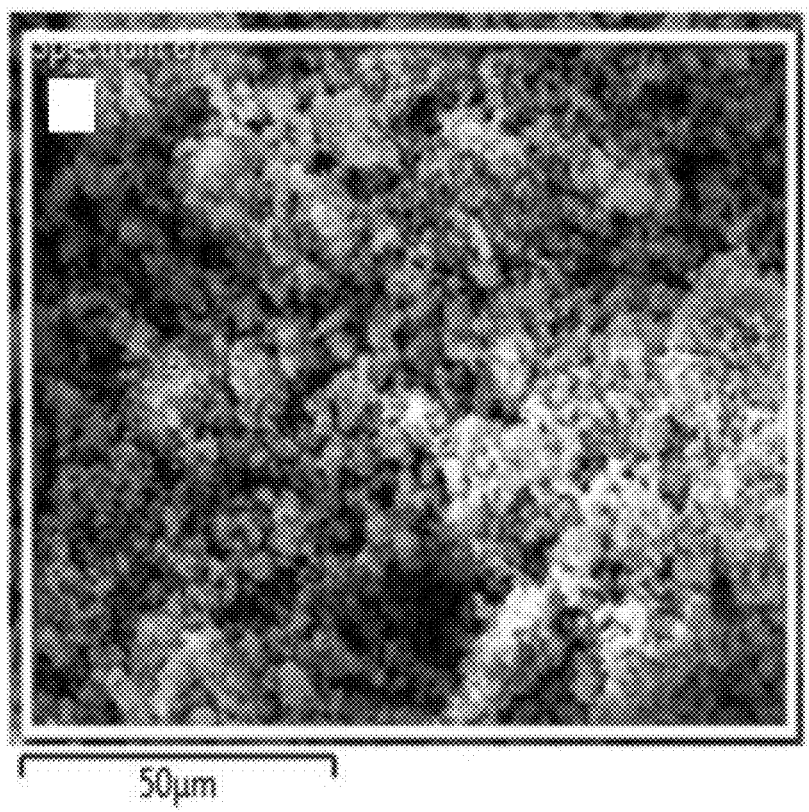
FIG. 5E is a SEM image (scale bar: 50 µm) of Mo-based hydrodesulfurization catalyst ZTV 10.
Figure 5F:
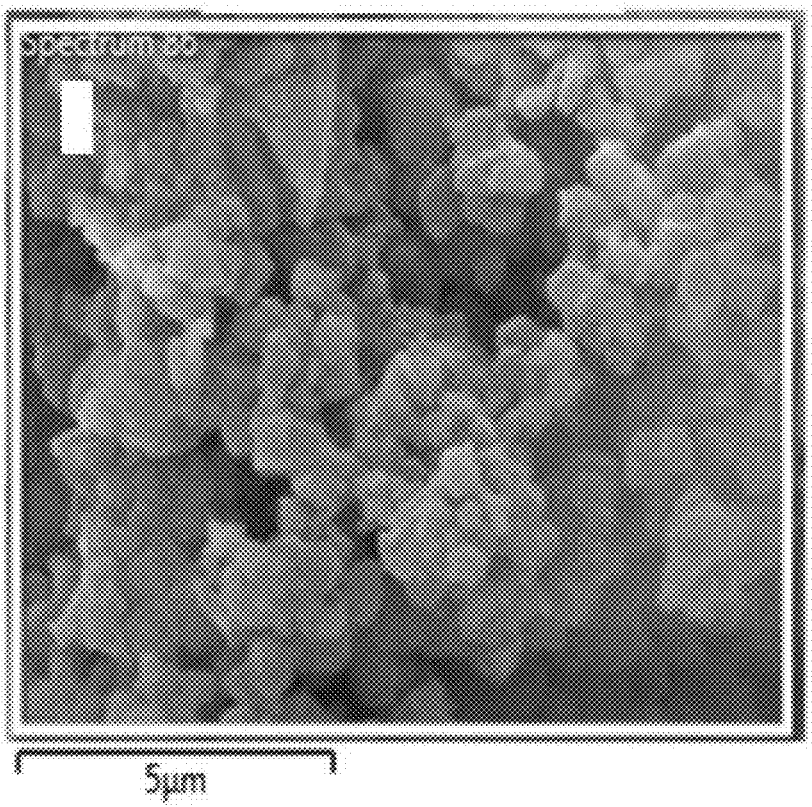
FIG. 5F is a SEM image (scale bar: 5 µm) of Mo-based hydrodesulfurization catalyst ZTV 10.

Elemental composition and surface morphology of the prepared materials, namely ZVB, ZTV5 and ZTV10, were characterized by EDX and SEM. As shown in FIG. 4A, EDX spectrum indicated the presence of all elements participated in the synthesis of the catalyst including Al, Si, O, Co, Mo, and V. Spectroscopic data in FIGS. 4B and 4C indicated the amounts of titania introduced to the support were 2.9% and 4.8% for ZTV5 and ZTV10, respectively. SEM images were shown in FIGS. 5A-F. SEM images of ZVB in two scale bars (5 and 50 μm, FIGS. 5A and 5B) demonstrated the dispersion of the tri-metals on zeolite surface with some agglomeration and poor dispersion. In the case of ZTV5 and ZTV10 (FIGS. 5C-F), the introduction of titania to zeolite was found to enhance the dispersion of the active phase on the composite support surface. This observation was confirmed when the percentage of titania within the zeolite support was increased.

Figure 6:
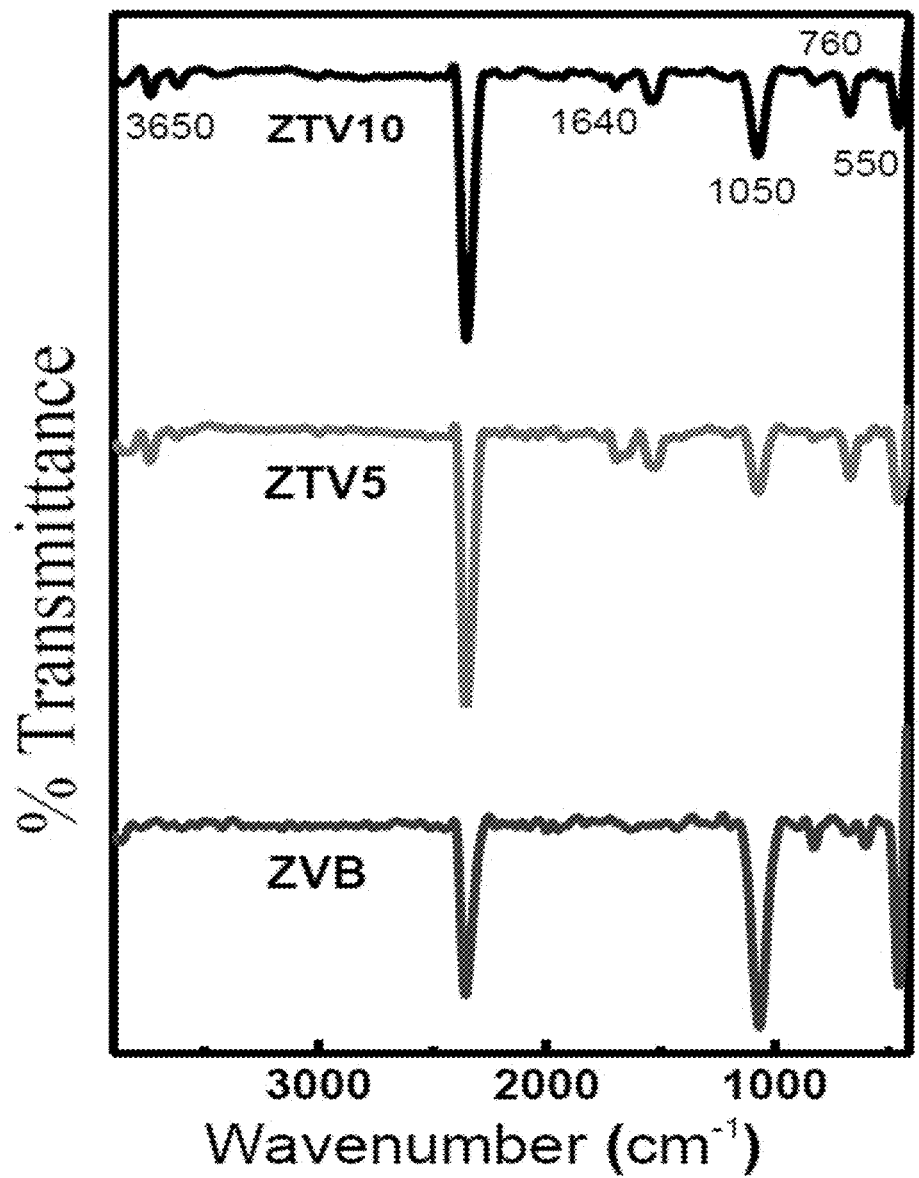
FIG. 6 is an overlay of FTIR spectra of Mo-based hydrodesulfurization catalysts ZTV 5 and ZTV 10 and control catalyst ZVB, respectively.

FTIR was used to obtain information of functional groups on the prepared materials. In FIG. 6, peaks at 550-870 $cm^{-1}$ were attributed to symmetrical and asymmetrical terminal stretches of MoO. Characteristic bands observed at 1050, 760, and 550 $cm^{-1}$ were assigned to central vibrational modes of Mo=O. The bridging bond of Mo—O—Mo was found to have a characteristic band at 810 $cm^{-1}$. Presence of bands in the region from 550 to 1000 $cm^{-1}$ indicated high dispersion of the active phase on the composite support surface. The band at 1640 $cm^{-1}$ was attributed to —OH bending [A. Barth, The infrared absorption of amino acid side chains, Prog. Biophys. Mol. Biol. 74 (2000) 141-173; and T. A. Saleh, Isotherm, kinetic, and thermodynamic studies on Hg(II) adsorption from aqueous solution by silica-multiwall carbon nanotubes, Environ. Sci. Pollut. Res. 22 (2015) 16721-16731, each incorporated herein by reference in their entirety].

Figure 7:
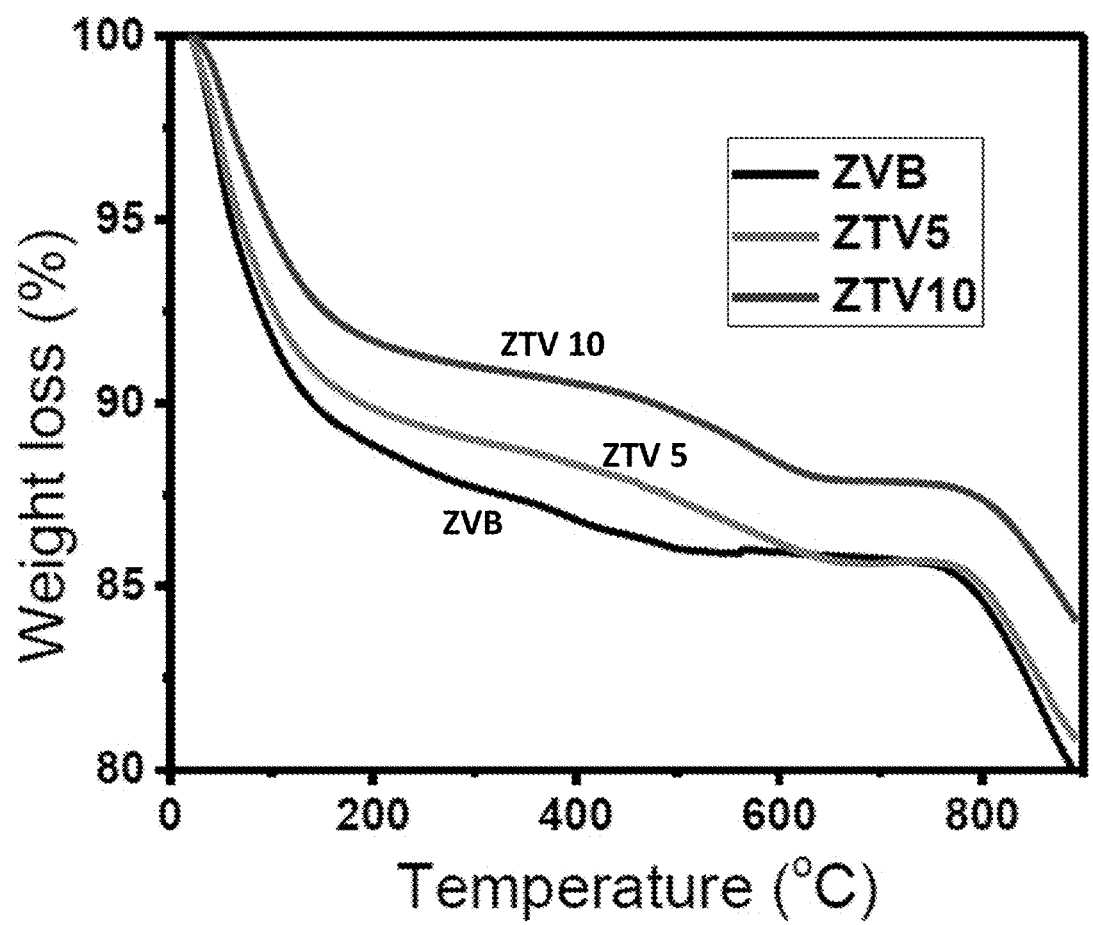
FIG. 7 is an overlay of thermogravimetric analysis (TGA) curves of Mo-based hydrodesulfurization catalysts ZTV 5 and ZTV 10 and control catalyst ZVB, respectively.

Catalyst stability at elevated temperature is an important factor that needs to be evaluated. The stability of the presently disclosed catalysts was measured using thermogravimetric analysis (TGA) to analyze their application for HDS catalysis. TGA curves of ZVB, ZTV5, and ZTV10 were illustrated in FIG. 7. It was observed that the three catalysts had 18-19% weight loss as temperature reached above 900° C. At around 400° C., the weight loss of ZVB was 13.6%, while for ZTV5 and ZTV10, the weight losses were 11.9 and 9.3%, respectively. Total decomposition of the material was observed at 850° C., during which ZVB had about 19% weight loss, ZTV5 and ZTV10 each had about 18% and about 15% weight loss.

Example 5

Surface and Textural Properties

Figure 8A:
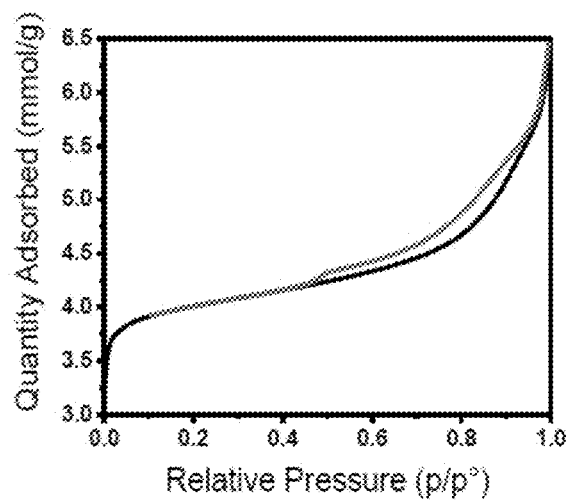
FIG. 8A is a N$_2$ adsorption-desorption isotherm of control catalyst ZVB.
Figure 8B:
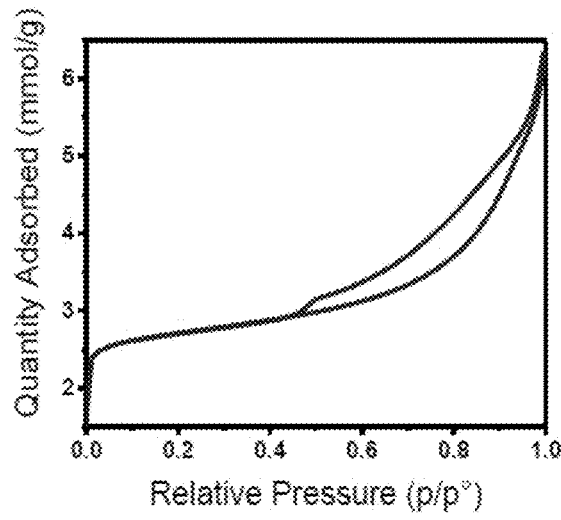
FIG. 8B is a N$_2$ adsorption-desorption isotherm of Mo-based hydrodesulfurization catalyst ZTV 5.
Figure 8C:
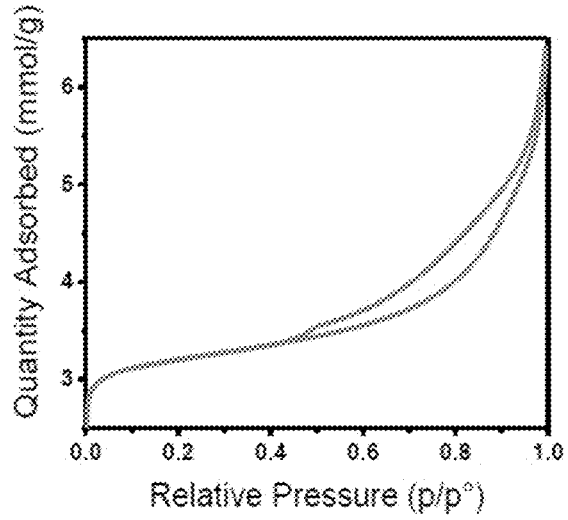
FIG. 8C is a N$_2$ adsorption-desorption isotherm of Mo-based hydrodesulfurization catalyst ZTV 10.
Figure 8D:
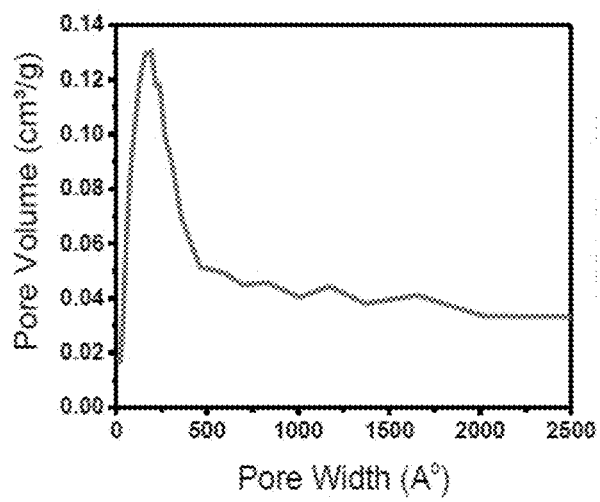
FIG. 8D is a graph showing pore size distribution of control catalyst ZVB.
Figure 8E:
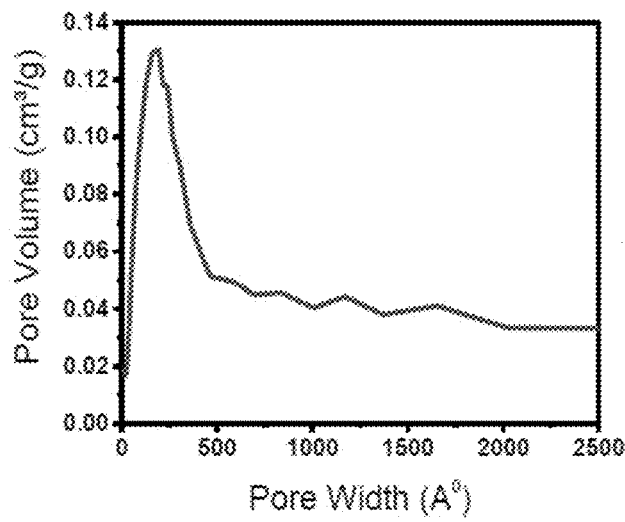
FIG. 8E is a graph showing pore size distribution of Mo-based hydrodesulfurization catalyst ZTV 5.
Figure 8F:
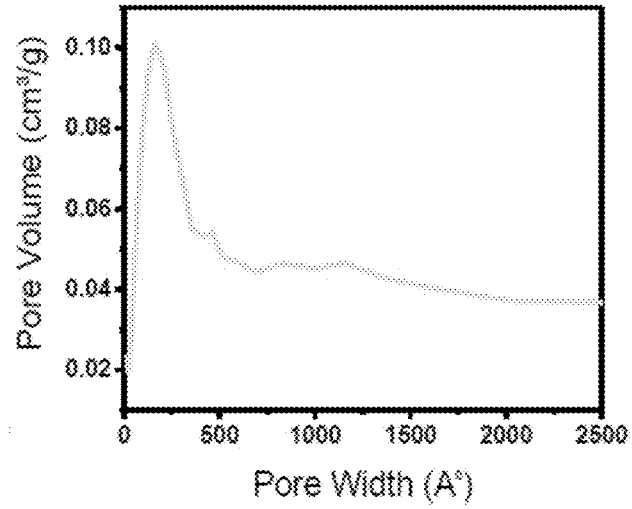
FIG. 8F is a graph showing pore size distribution of Mo-based hydrodesulfurization catalyst ZTV 10.
Figure 8G:
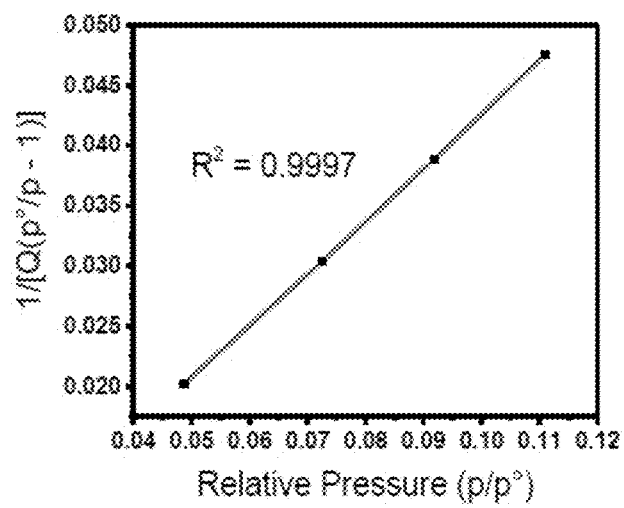
FIG. 8G is a BET surface area plot of control catalyst ZVB.
Figure 8H:
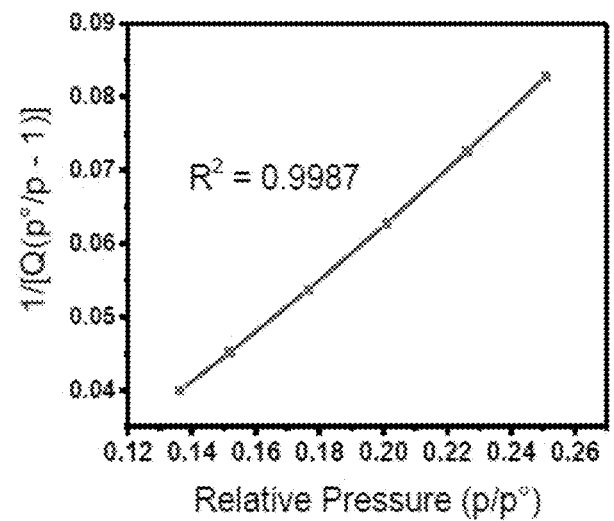
FIG. 8H is a BET surface area plot of Mo-based hydrodesulfurization catalyst ZTV 5.
Figure 8I:
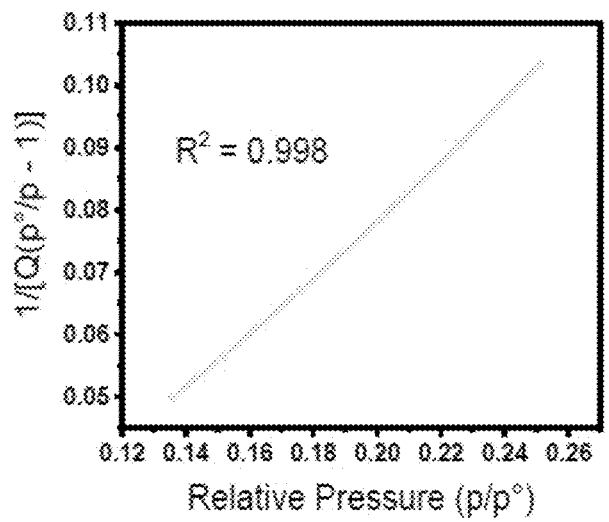
FIG. 8I is a BET surface area plot of Mo-based hydrodesulfurization catalyst ZTV 10.

The adsorption-desorption isotherms for ZVB, ZTV5, and ZTV10 are shown in FIGS. 8A, 8B, and 8C. The isotherm curves for the three catalysts were type IV like isotherm with meso-micro porous contributions in the adsorption-desorption process. Presence of the hysteresis loop at high pressure level indicated the mesoporous character of the catalyst material. The nitrogen uptake at relatively low pressure indicated the microporous nature of the catalyst material.

Table 1 summarizes textural properties of the prepared catalysts. There is a decrease in surface area, microporous surface area, total pore volume, and average pore size when increased amount of titania was introduced. This indicated that the addition of titania decreased the catalyst mesoporous size. Such pore size reduction may be resulted from high proportion and microporous nature of pure titania.

TABLE 1

$N_2$ physisorption data for the prepared catalyst

| Catalyst | BET Surface area (m²/g). | Mesopore surface area (m²/g). | Micropore surface area (m²/g). | Micropore volume (m²/g). | Total pore volume (cm³/g). | Average pore size (nm). |
|---|---|---|---|---|---|---|
| ZVB | 270 | 219 | 50 | 0.09 | 0.2 | 2.9 |
| ZTV5 | 223 | 174 | 44 | 0.08 | 0.18 | 3.2 |
| ZTV10 | 217 | 170 | 39 | 0.09 | 0.17 | 3.3 |

Example 6

Temperature Programmed Desorption (TPD)

Figure 9:
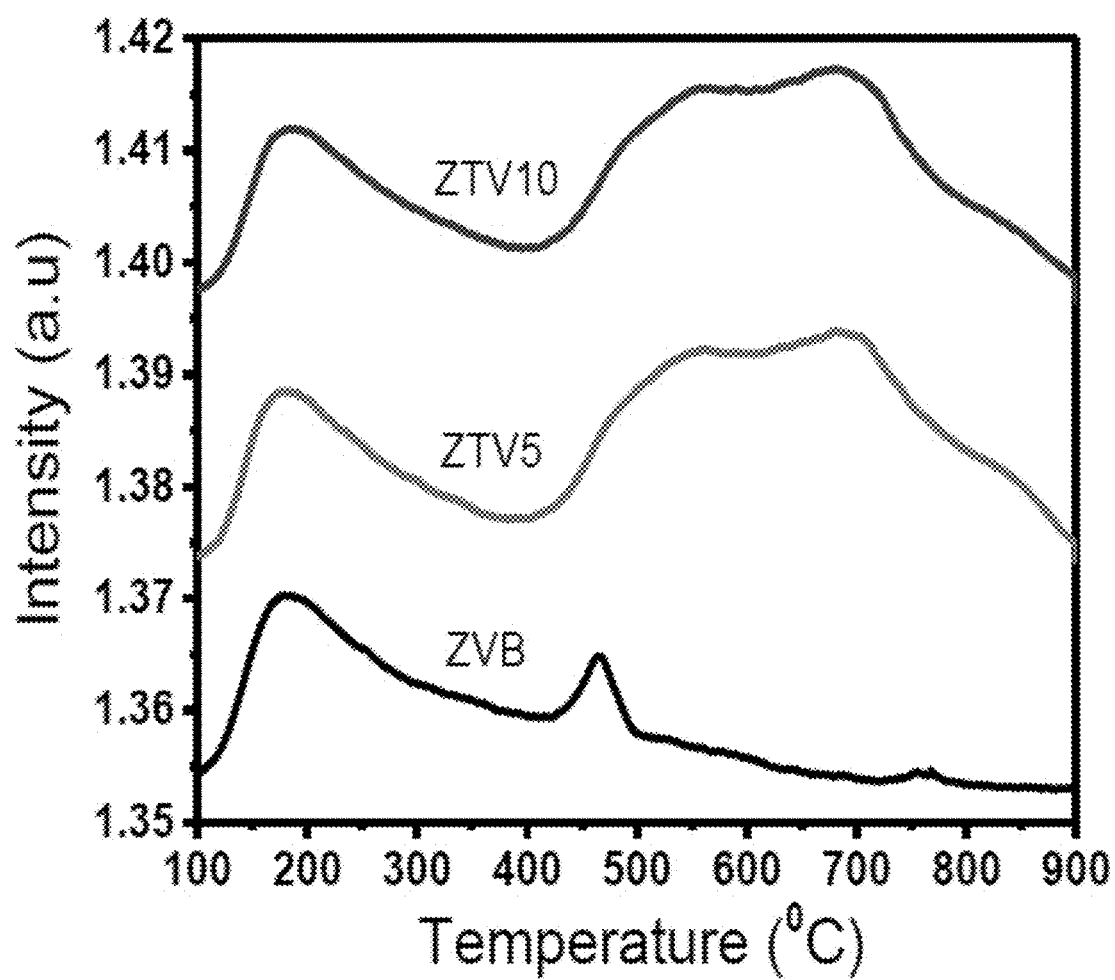
FIG. 9 is an overlay of temperature programmed desorption (TPD) by NH$_3$ profiles of Mo-based hydrodesulfurization catalysts ZTV 5 and ZTV 10 and control catalyst ZVB, respectively.

The acidic strength of the synthesized catalysts ZVB, ZTV5, and ZTV10 were characterized by TPD (FIG. 9). The weak acid sites observed at 100-300° C. were found in all the three catalysts. It could be noted that ZVB had a medium acid site at 400-500° C. Interestingly, ZTV5 and ZTV10 catalysts has medium acid site combined with strong acid site. The increase in acid strength (Table 2) may be resulted from the presence of titania. This trend further supports our findings in the HDS performance of the catalysts discussed below.

TABLE 2

Results of temperature programmed desorption

| Sample | Temperature (° C.) | Quantity (cm³/g STP) |
|---|---|---|
| ZVB | 177 | 7 |
|  | 467 | 0.9 |
| ZTV5 | 177 | 6 |
|  | 681 | 22 |
| ZTV10 | 182 | 8 |
|  | 684 | 23 |

Example 7

HDS Activity of the Prepared Catalyst

Figure 10:
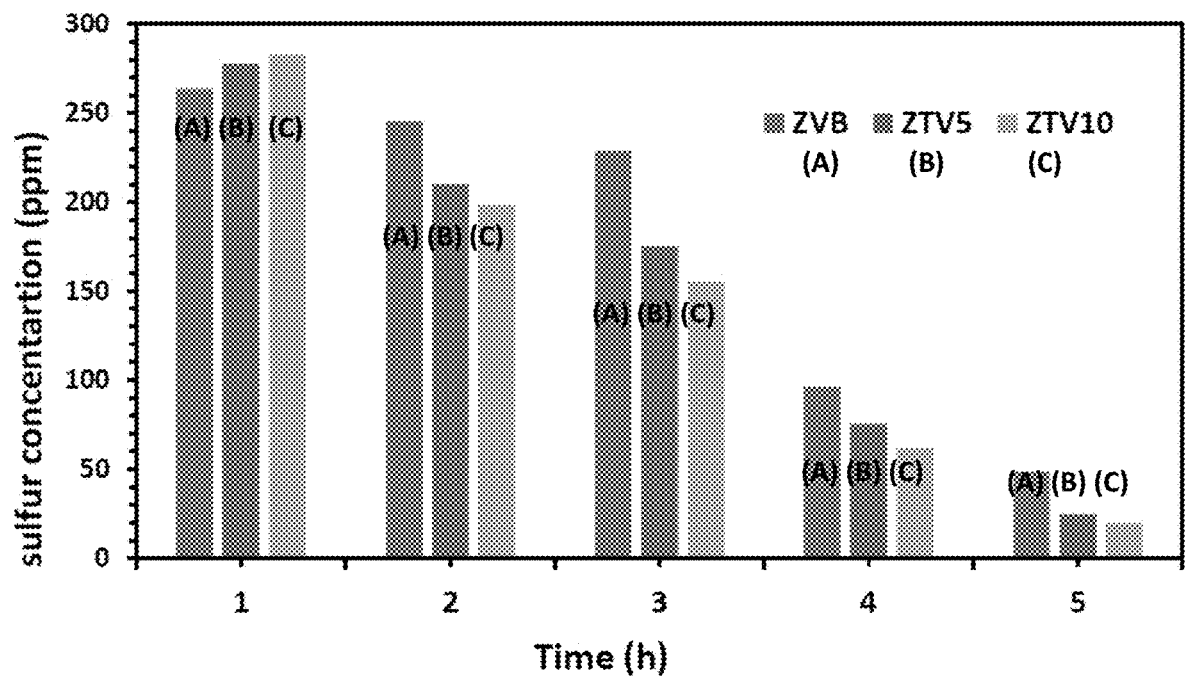
FIG. 10 is a bar graph summarizing hydrodesulfurization catalytic activities of Mo-based hydrodesulfurization catalysts ZTV 5 and ZTV 10 and control catalyst ZVB, respectively, at different contact times (see Example 3 for detailed operation conditions).
Figure 11:
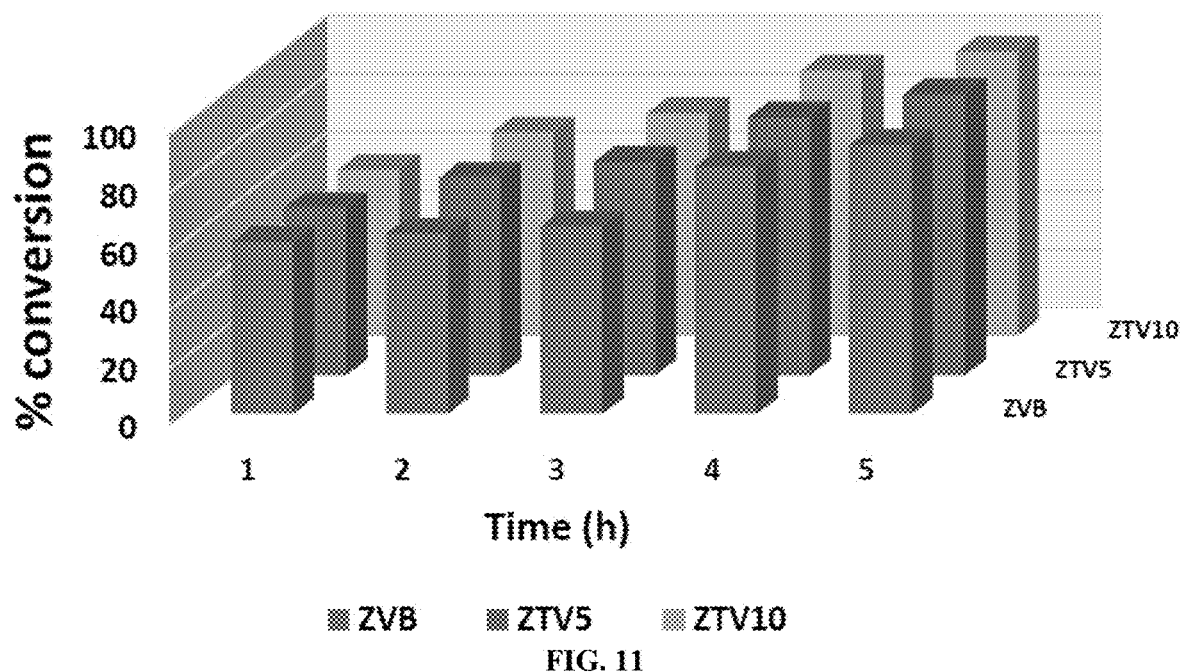
FIG. 11 is a graph showing hydrodesulfurization conversion rates of Mo-based hydrodesulfurization catalysts ZTV 5 and ZTV 10 and control catalyst ZVB, respectively, at different contact times (see Example 3 for detailed operation conditions).

The catalytic activity of ZVB, ZTV5, and ZTV10 for dibenzothiophene hydrodesulfurization in adecalin solvent as a function of reaction time is summarized in FIG. 10. The reaction condition included:hydrogen partial pressure of 55 bar, temperature of 300° C., rotation of 180 rpm, and catalyst amount of 0.5 g in 100 mL of the model fuel. It was observed that ZTV5 and ZTV10 demonstrated better catalytic performance compared to ZVB. After 5 hours of the reaction, the concentration sulfur in ZVB sample was 48.4 ppm, while the concentrations of sulfur in ZTV5 and ZTV10 samples were 24.8 and 19.7 ppm, respectively. This could be attributed to the role of titania in facilitating the dispersion of catalytic metal species on the support. The enhanced dispersion greatly increased the catalytic activity of the catalysts ZTV5 and ZTV10. Experimental results in terms of sulfur conversion in percentage are presented in FIG. 11. Catalysts ZTV5 and ZTV10 have shown good stability at elongated test time. After 5 hours, 96% sulfur removal was achieved, which indicated the high efficiency of the catalyst. A comparison between currently disclosed catalysts and other previously reported catalysts can be found in Table 3.

TABLE 3

Comparison between ZTV10 catalyst and some other reported ones

| Catalyst | Reactor type | sulfur conc. | Conversion % | Temperature | Reference |
|---|---|---|---|---|---|
| ZTV10 | Batch reactor | 550 ppm-S | 96.9% | 300° C. | Current Work |
| MoCo/CNT | Fixed bed | 1300 ppm-S | 73.5% | 280° C. | [a] |
| Co—Mo/Al$_2$O$_3$ | Packed bed | 4000 ppm-S | 67% | 300° C. | [b] |
| MoN$_x$/Al$_2$O$_3$ + AC | Trible bed | 0.1 wt % DBT in decalin | 82% | 300° C. | [c] |
| CoMo/SBA-15 | Batch reactor | 2160 ppm-S | 77% | 300° C. | [d] |
| NiMo/—Al$_2$O$_3$ | Packed bed | 740 ppm-S | 90% | 350° C. | [e] |

References:

[a] M. I. Mohammed, A. A. Abdul Razak, M. A. Shehab, Synthesis of Nanocatalyst for Hydrodesulfurization of Gasoil Using Laboratory Hydrothermal Rig, Arab. J. Sci. Eng. 42 (2017) 1381-1387;

[b] T. Kabe, W. Qian, S. Ogawa, A. Ishihara, Mechanism of Hydrodesulfurization of Dibenzothiophene on CoMoAl$_2$O$_3$ and CoAl$_2$O$_3$ Catalyst by the Use of Radioisotope 35S Tracer, J. Catal. 143 (1993) 239-248;

[c] F. Liu, S. Xu, Y. Chi, D. Xue, A novel alumina-activated carbon composite supported NiMo catalyst for hydrodesulfurization of dibenzothiophene, Catal. Commun. 12 (2011) 521-524;

[d] L. Peña, D. Valencia, T. Klimova, CoMo/SBA-15 catalysts prepared with EDTA and citric acid and their performance in hydrodesulfurization of dibenzothiophene, Appl. Catal. B Environ. 147 (2014) 879-887; and

[e] E. Pedernera, R. Reimert, N. L. Nguyen, V. Van Buren, Deep desulfurization of middle distillates: Process adaptation to oil fractions' compositions, Catal. Today. 79-80 (2003) 371-381, each incorporated herein by reference in their entirety.

Example 8

HDS Reaction Mechanism

In a hydrodesulfurization process, there are two possible pathways regarding reaction mechanism, namely hydrogenation desulfurization (HYD), and direct desulfurization (DDS). For the first mechanism, HYD of the aromatic ring occurs initially, which is followed by desulfurization. While for the second mechanism, hydrogen removes sulfur directly without interference of aromatic rings [I. Mochida, K. H. Choi, An overview of hydrodesulfurization and hydrodenitrogenation, J. Japan Pet. Inst. 47 (2004) 145-163; and F. Bataille, J. L. Lemberton, P. Michaud, G. Pérot, M. Vrinat, M. Lemaire, E. Schulz, M. Breysse, S. Kasztelan, Alkyldibenzothiophenes hydrodesulfurization-promoter effect, reactivity, and reaction mechanism, J. Catal. 191 (2000) 409-422].

Figure 13B:
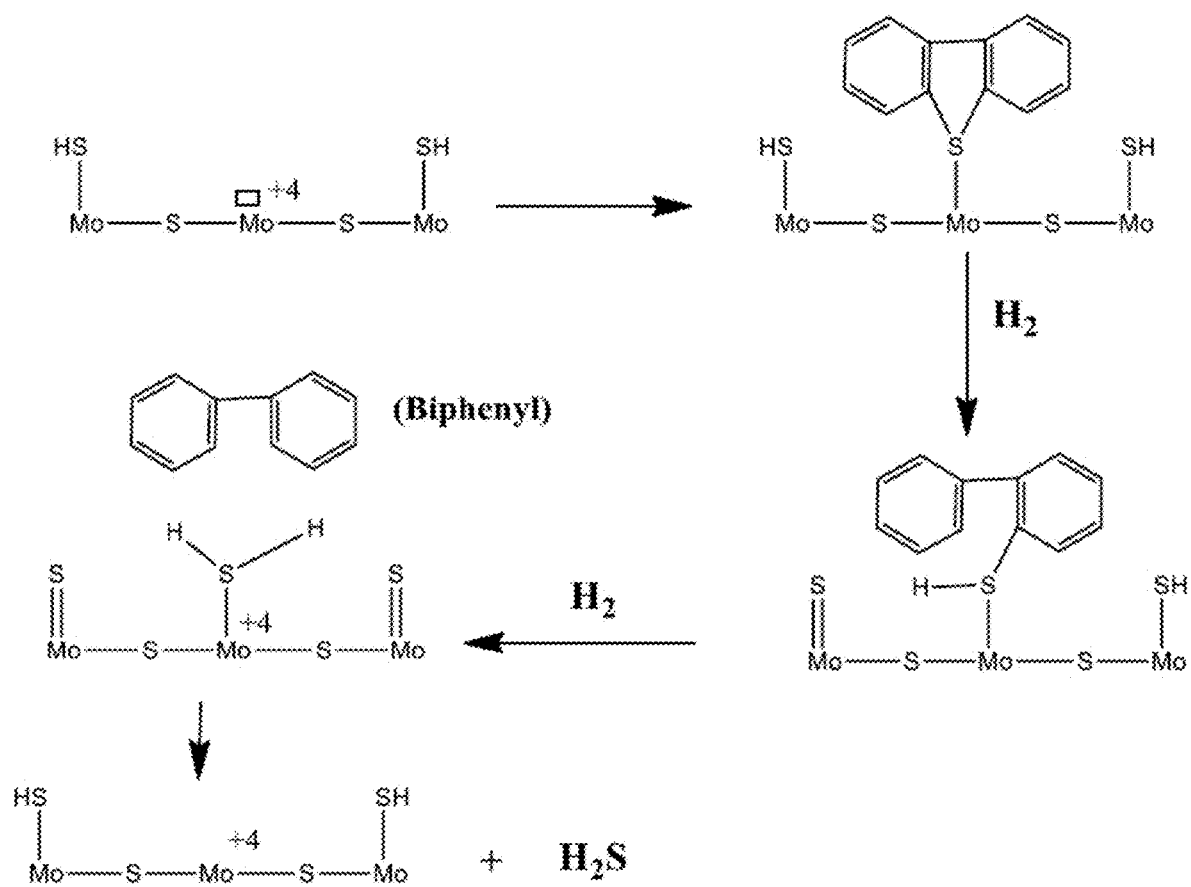
FIG. 13B shows hydrodesulfurization of dibenzothiophene via direct desulfurization (DDS) pathway.
Figure 14:
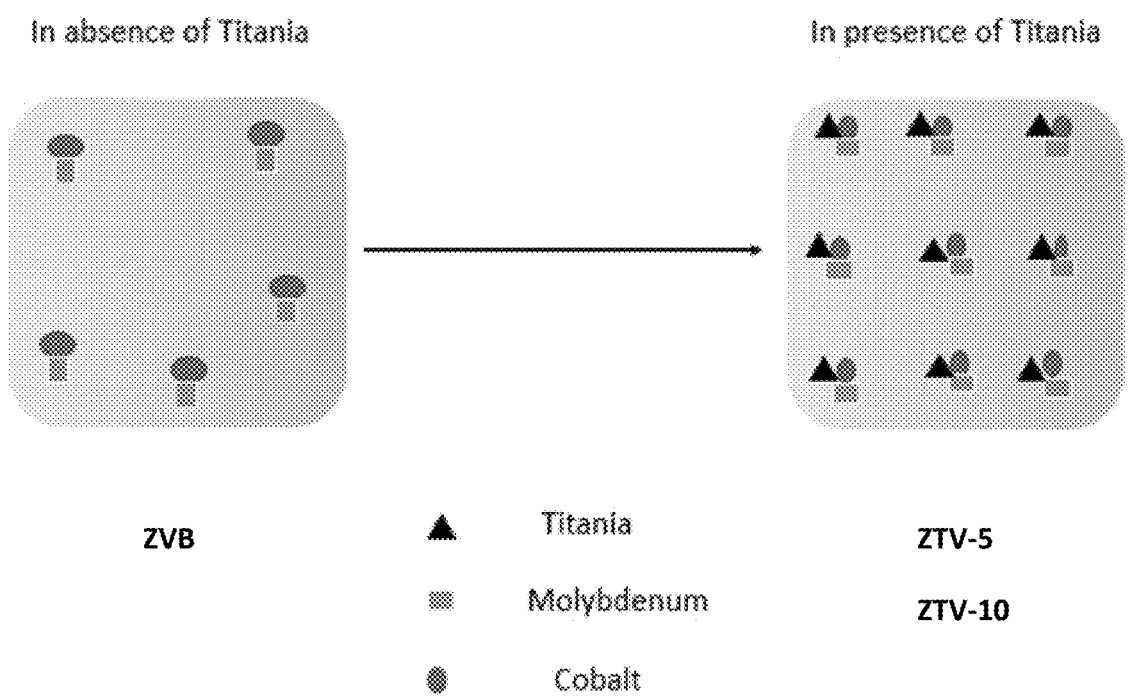
FIG. 14 is a schematic illustration showing Mo-based hydrodesulfurization catalyst and control catalyst ZVB.

The HDS reaction mechanism of dibenzothiophene over ZTV-5 and ZTV-10 catalysts was illustrated in FIGS. 13A and 13B. It is proposed that the removal of sulfur by DDS pathway occurs via cleavage of C—S bond, and production of biphenyl as the dominant product (FIG. 13A). Hydrogenation of biphenyl forms cyclohexyl benzene. Two products including hexahydrodibenzothiophene and tetrahydrodibenzothiophene, which are considered as the intermediates for hydrogenation pathway, were not observed by the inventor. Desulfurization of these intermediate products occurred to give cyclohexyl benzene as a secondary product. In both mechanisms, cyclohexyl was formed at trace level because of cyclohexyl benzene hydrogenation. The interaction of the catalyst with DBT was illustrated in FIG. 13B [C. YIN, X. ZHAI, L. ZHAO, C. LIU, Mechanism of Hydrodesulfurization of dibenzothiophenes on unsupported NiMoW catalyst, J. Fuel Chem. Technol. 41 (2013) 991-997].

Figure 12A:
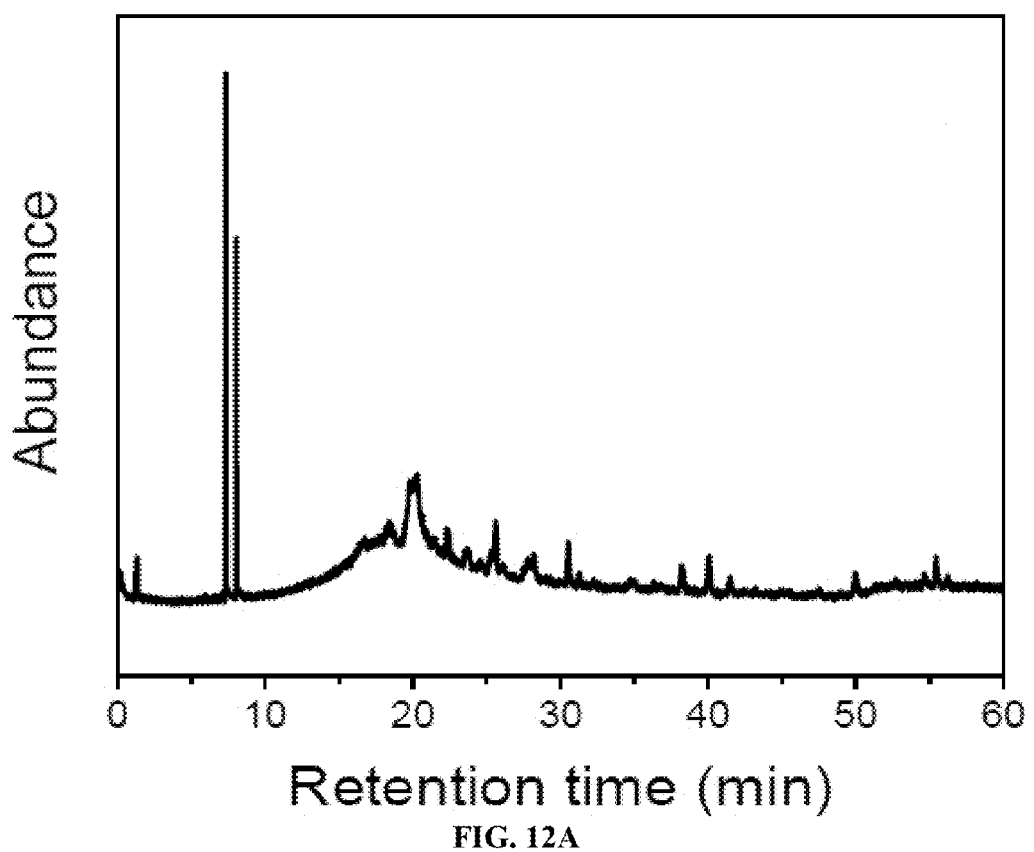
FIG. 12A is a gas chromatogram showing hydrodesulfurization of dibenzothiophene in the presence of Mo-based hydrodesulfurization catalyst.
Figure 12B:
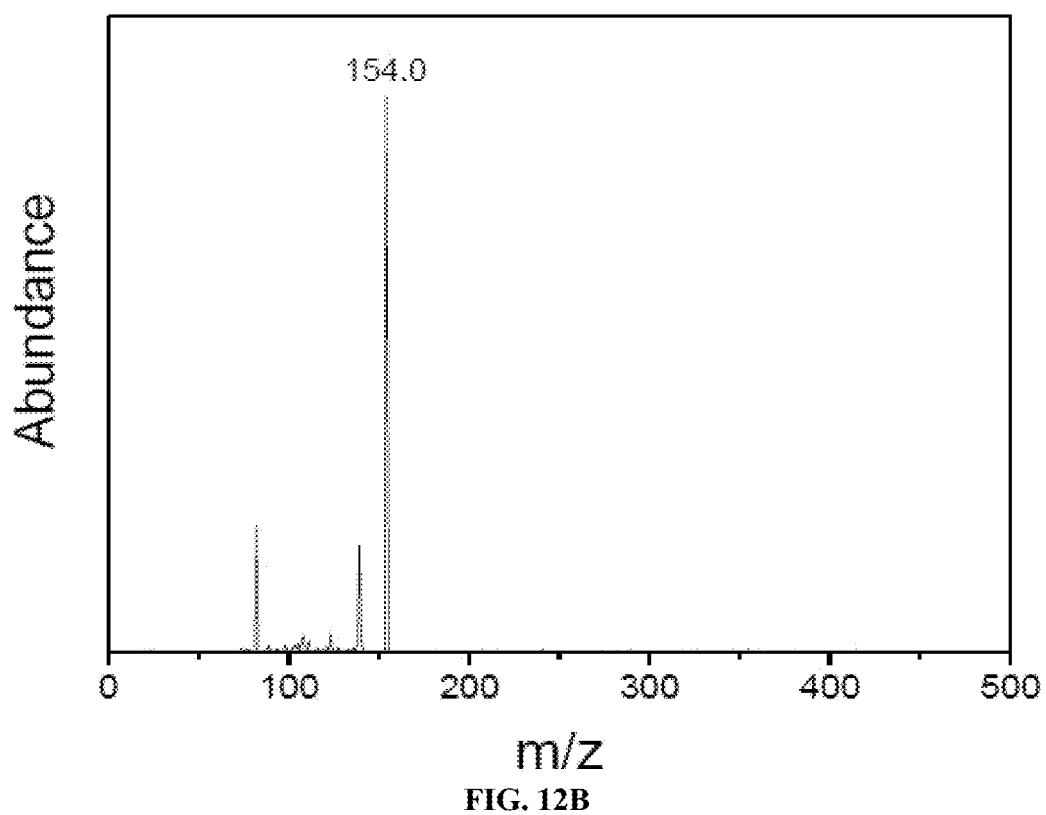
FIG. 12B is a mass spectrum identifying biphenyl product formed via hydrodesulfurization of dibenzothiophene.
Figure 12C:
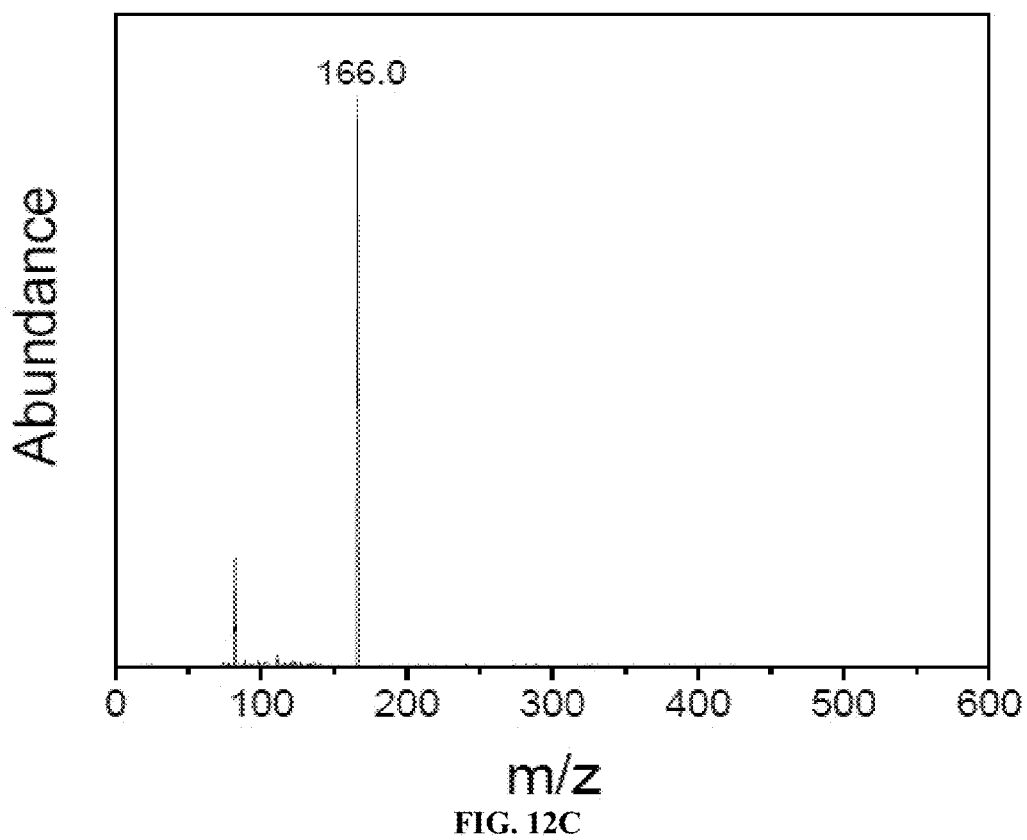
FIG. 12C is a mass spectrum identifying bicyclohexyl product formed via hydrodesulfurization of dibenzothiophene.

To further understand the dominant mechanism pathway for the catalyst, the fuel was collected after HDS reaction, and analyzed by GC-MS. The chromatogram and abundance plots are depicted in FIGS. 12A-C. As shown in FIG. 12A, the signals obtained from GC-MS were relatively complex due to a large number of compounds detected in each analysis. The characteristic peak of biphenyl was observed at around 154.0 m/z (FIG. 12B), and the bicyclohexyl peak was seen at 166.0 m/z (FIG. 12C). From the discussion above, the HDS reaction over the presently disclosed catalysts occurs predominantly via hydrogenolysis reaction mechanism pathway.

Example 9

In summary, catalysts having composites of zeolite modified with different percentages of titania as support material are disclosed. Specifically, molybdenum, cobalt, and vanadium (MoCoV) based catalysts were loaded on zeolite modified with different amounts of titanium oxide. Titania loading has a role in enhancing the dispersion of the active phase of the MoCoV catalyst nanoparticles.

Catalytic performance of the catalysts in reactions such as hydrodesulfurization (HDS) of dibenzothiophene (DBT) was evaluated. Temperature-programmed desorption (TPD), powder X-ray diffraction (XRD), $N_2$ adsorption-desorption, scanning electron microscope (SEM), infrared spectroscopy (FT-IR), electron dispersive X-ray spectroscopy (EDS), and thermogravimetric analysis (TGA) were used to characterize the catalysts and gain insight into their morphological and structural properties that could affect the catalytic performance. Based on the catalytic performance and characterization, a mechanism was proposed to explain the DBT cracking.

The results of the present disclosure demonstrate the importance of titania loading on zeolite for the formation of composite support. The activity for dibenzothiophene degradation has been improved upon addition of titania. The SEM images illustrated the role of titania in enhancing the dispersion of the active phase on the support surface. Addition of titania to zeolite support could weaken the interaction between the active phase and support surface. TPD was applied to analyze the acidic strength of the calcined catalyst. It was found that addition of titania has improved the catalyst acidity. BET measurements showed that all catalysts exhibited type IV isotherm with micro/mesoporous contributions. Characteristic peaks of titania found in XRD data confirmed the inclusion of titania to the support. Elemental composition of the catalyst was analyzed by EDS. Two main pathways, namely hydrogenation desulfurization (HYD) and hydrogenolysis (DDS) pathways, were proposed for HDS reactions. According to the results obtained from GC-MS analysis, the HDS reaction over presently disclosed ZTV catalysts (ZTV-5 and ZTV-10) was proposed to occur via the DDS mechanism pathway. It has been established that currently disclosed ZTV catalysts (ZTV-5 and ZTV-10) are effective in catalyzing HDS reactions that decrease the sulfur level. A comparison of the catalyst with those reported in literature indicated that the former is a promising catalyst for fuel HDS. The catalyst may be suitable for industrial applications including sulfur removal.

The invention claimed is:

1. A Mo-based hydrodesulfurization catalyst, comprising:
   a support material comprising a titania-modified zeolite; and
   a catalytic material disposed on the support material, wherein:
   the catalytic material comprises molybdenum and at least one promoter;
   the support material has a weight ratio of zeolite to titania in a range of 5:1 to 25:1;
   the support material has a Si:Al weight ration of 2:1 to 3:1, and a Si:Ti weight ratio of 3:2 to 7:1; and
   the Mo-based hydrodesulfurization catalyst has a molybdenum content in a range of 10-25 wt % relative to a total weight of the Mo-based hydrodesulfurization catalyst.

2. The Mo-based hydrodesulfurization catalyst of claim 1, wherein the at least one promoter comprises cobalt, vanadium, or both.

3. The Mo-based hydrodesulfurization catalyst of claim 2, wherein the at least one promoter comprises cobalt, and wherein the Mo-based hydrodesulfurization catalyst has a cobalt content in a range of 1-5 wt % relative to a total weight of the Mo-based hydrodesulfurization catalyst.

4. The Mo-based hydrodesulfurization catalyst of claim 2, wherein the at least one promoter comprises vanadium, and wherein the Mo-based hydrodesulfurization catalyst has a vanadium content in a range of 0.5-4 wt % relative to a total weight of the Mo-based hydrodesulfurization catalyst.

5. The Mo-based hydrodesulfurization catalyst of claim 2, wherein the at least one promoter comprises cobalt and vanadium.

6. The Mo-based hydrodesulfurization catalyst of claim 1, which has a BET surface area in a range of 180-250 $m^2/g$.

7. A Mo-based hydrodesulfurization catalyst, comprising:
   a support material comprising a titania-modified zeolite; and a catalytic material disposed on the support material, wherein:

the catalytic material comprises molybdenum and at least one promoter;

the support material has a weight ratio of zeolite to titania in a range of 5:1 to 25:1;

the Mo-based hydrodesulfurization catalyst has a molybdenum content in a range of 10-25 wt % relative to a total weight of the Mo-based hydrodesulfurization catalyst and wherein the hydrodesulfurization catalyst has a total pore volume of 0.15-0.195 cm$^3$/g, and an average pore size of 3-5 nm.

8. A method of preparing the Mo-based hydrodesulfurization catalyst of claim 5, the method comprising:

mixing a zeolite and titania in a first solvent in the presence of polyvinylpyrrolidone to form a reaction slurry;

heating the reaction slurry to form a support material comprising a titania-modified zeolite;

mixing the support material, a molybdenum precursor, a cobalt precursor, and a vanadium precursor in a second solvent to form a reaction mixture;

drying the reaction mixture to form a dried mass; and calcining the dried mass thereby forming the Mo-based hydrodesulfurization catalyst.

9. The method of claim 8, wherein the reaction slurry is heated at a temperature of 80-200° C. for 2-10 hours.

10. The method of claim 8, wherein the dried mass is calcined at a temperature of 250-500° C. for 0.5-6 hours.

11. The method of claim 8, wherein the molybdenum precursor is ammonium heptamolybdate(VI).

12. The method of claim 8, wherein the cobalt precursor is cobalt(II) nitrate, and wherein the vanadium precursor is vanadium(V) pentoxide.

13. The method of claim 8, wherein the first solvent and the second solvent independently comprise water, an alcohol, or both.

* * * * *